US010547849B1

(12) United States Patent
Bellows et al.

(10) Patent No.: US 10,547,849 B1
(45) Date of Patent: Jan. 28, 2020

(54) LOW-POWER AND LOW-LATENCY DISTORTION CORRECTION FOR IMAGE PROCESSORS

(71) Applicant: Rockwell Collins, Inc., Cedar Rapids, IA (US)

(72) Inventors: Peter R. Bellows, Marion, IA (US); Andrew J. LeVake, Cedar Rapids, IA (US); Sung J. Kim, Cedar Rapids, IA (US); David W. Jensen, Marion, IA (US); Allen P. Mass, Lisbon, IA (US); John K. Gee, Mount Vernon, IA (US); Jeffrey D. Russell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 254 days.

(21) Appl. No.: 15/060,428

(22) Filed: Mar. 3, 2016

(51) Int. Cl.
*H04N 19/147* (2014.01)
*H04N 19/126* (2014.01)
*H04N 19/182* (2014.01)
*H04N 19/132* (2014.01)

(52) U.S. Cl.
CPC ......... *H04N 19/147* (2014.11); *H04N 19/126* (2014.11); *H04N 19/132* (2014.11); *H04N 19/182* (2014.11)

(58) Field of Classification Search
CPC .. H04N 19/147; H04N 19/126; H04N 19/132; H04N 19/182
USPC .................................................. 375/240.27
See application file for complete search history.

(56) References Cited

U.S. PATENT DOCUMENTS

| 5,892,348 A * | 4/1999 | Norman ................ G06T 3/4023 318/701 |
| 6,853,330 B1 * | 2/2005 | Krikorian ............. G01S 7/4026 342/149 |
| 2006/0188172 A1 * | 8/2006 | Higurashi ............... G06T 5/006 382/275 |

(Continued)

OTHER PUBLICATIONS

A. Hernandez et al., Real-Time Image Distortion Correction using FPGA-based System, IEEE Industrial Electronics, IECON 2006—32nd Annual Conference, Nov. 6-10, 2006, IEEE, 5 pages.

(Continued)

*Primary Examiner* — William C Vaughn, Jr.
*Assistant Examiner* — Jae N Noh
(74) *Attorney, Agent, or Firm* — Suiter Swantz pc llo

(57) ABSTRACT

An image processing system incorporates a distortion correction (DC) sub-system in order to quickly correct skewed images. The DC sub-system includes a buffer, a processor and a sparse matrix table (SMT). The buffer is sized according to an amount of distortion in an input image. Input image pixels from an input frame are buffered in the buffer, and other input image pixels from the same frame overwrite the buffered input image pixels, reducing latency of the DC sub-system. The SMT is dynamically configurable and provides mapping values for mapping output pixels to input pixels. The processor implements combinational logic, including multipliers, lookup tables and adders. The combinational logic interpolates flow control parameters, pixel coordinate values, and pixel intensity values. The distortion correction values are streamed to a display or provided to a subsequent image processing block for further processing.

20 Claims, 18 Drawing Sheets

(56) References Cited

U.S. PATENT DOCUMENTS

| | | | | |
|---|---|---|---|---|
| 2007/0206877 A1* | 9/2007 | Wu | ...................... | G06K 9/3283 |
| | | | | 382/275 |
| 2009/0087115 A1* | 4/2009 | Wong | .................... | G06T 3/0018 |
| | | | | 382/255 |
| 2017/0206689 A1* | 7/2017 | Eo | ......................... | G06T 3/4007 |
| 2017/0282813 A1* | 10/2017 | Hashimoto | ............ | B60R 11/04 |
| 2017/0293810 A1* | 10/2017 | Allen | ................ | G06K 9/00791 |

OTHER PUBLICATIONS

Arthur Coste, CS6640: Image Processing, Project 3, Affine Transformation, Landmarks registration, Non linear Warping, Oct. 2012, University of Utah, 54 pages.

* cited by examiner

LOW-POWER AND LOW-LATENCY DISTORTION CORRECTION FOR IMAGE PROCESSORS

BACKGROUND

Image and video processing systems are being optimized for size, weight and power (SWAP) constraints. Because the processing systems are smaller and are designed for minimal power consumption, the underlying hardware and algorithms for conducting the image and video processing must be more effective and efficient. Designing such effective and efficient hardware and algorithms to meet SWAP constraints becomes all the more challenging as demands and industry standards for high quality video output (e.g., 1080p high-definition (HD) streaming) continue to increase.

Distortion correction is an essential function of most optical systems. The video stream is subjected to a number of distortions as it passes through the system, including distortions from the shape of the lens (e.g. "fisheye" effects), chromatic aberration (where different wavelengths of light have different focal lengths), the boresighting of the sensor, and the display optics. All of these effects require distortion correction to geometrically skew the video stream so it is displayed "as the human eye would have seen it."

Several approaches exist for distortion correction in conventional environments; however these have proven unsuitable for applications with extremely demanding power and latency requirements. Demanding power and latency requirements are typical in many image processing systems (e.g., smart phones, tablets or personal digital assistants (PDAs)). The demand for low-power and low-latency is emphasized in man-portable displays for combat, near-to-eye displays for air traffic control (ATC), or head-mounted displays (HMD) for pilots. Any of these systems simultaneously require pristine video quality, long battery life, and extremely low latency to ensure fastest response to life-threatening situations. Low latency is especially critical to avoid disorientation or nausea for users of real-time, head-worn displays. The processing demands in memory bandwidth and computation are very high, often to the exclusion of system-on-a-chip or similar implementations that would otherwise be chosen to meet low-power constraints. The low latency requirements preclude the use of normal frame buffering in conjunction with the underlying algorithms. Furthermore, other conventional approaches are insufficient when the low latency requirements are combined with a requirement for high video quality.

SUMMARY

In one aspect, the inventive concepts disclosed herein are directed to an image processor configured for distortion correction. In a further aspect, the image processor includes an image source for capturing an image frame including an input image having a distortion value. In a further aspect, the system includes a distortion correction sub-system comprising a buffer sized proportional to the distortion value of the input image, a data structure stored in a non-transitory processor-readable medium, and one or more processors coupled to the data structure and to the buffer. In a further aspect, the processor is configured to access, from the data structure, mapping values indicative of information to map output pixels of an output image to input pixels of the input image. In a further aspect, the processor is further configured to obtain weight values based on the mapping values. In a further aspect, the processor is further configured to determine distortion correction values based on the weight values and the mapping values. In a further aspect, the processor is further configured to provide the distortion correction values to a display or a subsequent image processing sub-block.

In another aspect, the inventive concepts disclosed herein are directed to an apparatus for distortion correction. In a further aspect, the apparatus includes a buffer sized proportionally to a distortion value of an input image. In a further aspect, the apparatus includes a data structure stored in a non-transitory processor-readable medium. In a further aspect, the apparatus includes a processor coupled to the data structure and the buffer. In a further aspect, the processor is configured to access, from the data structure, mapping values indicative of information to map output pixels of an output image to input pixels of the input image. In a further aspect, the mapping values include flow control parameters and pixel coordinate values. In a further aspect, the processor is configured to obtain weight values based on the mapping values. In a further aspect, the processor is further configured to determine distortion correction values based on the weight values and the mapping values. In a further aspect, the processor is configured to communicate the distortion correction values to a display or an image processing sub-block.

In another aspect, the inventive concepts disclosed herein are directed to a method for distortion correction. In a further aspect, the method includes accessing, by at least one processor, mapping values from a data structure stored in a non-transitory processor-readable medium, the mapping values indicative of information to map output pixels of an output image to input pixels of an input image. In a further aspect, the mapping values include flow control parameters and pixel coordinate values. In a further aspect, the method includes obtaining, by the at least one processor, weight values based on the mapping values. In a further aspect, the method includes determining, by the at least one processor, distortion correction values based on the weight values and the mapping values. In a further aspect, the method includes communicating, by the at least one processor, the distortion correction values to a display or an image processing sub-block.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
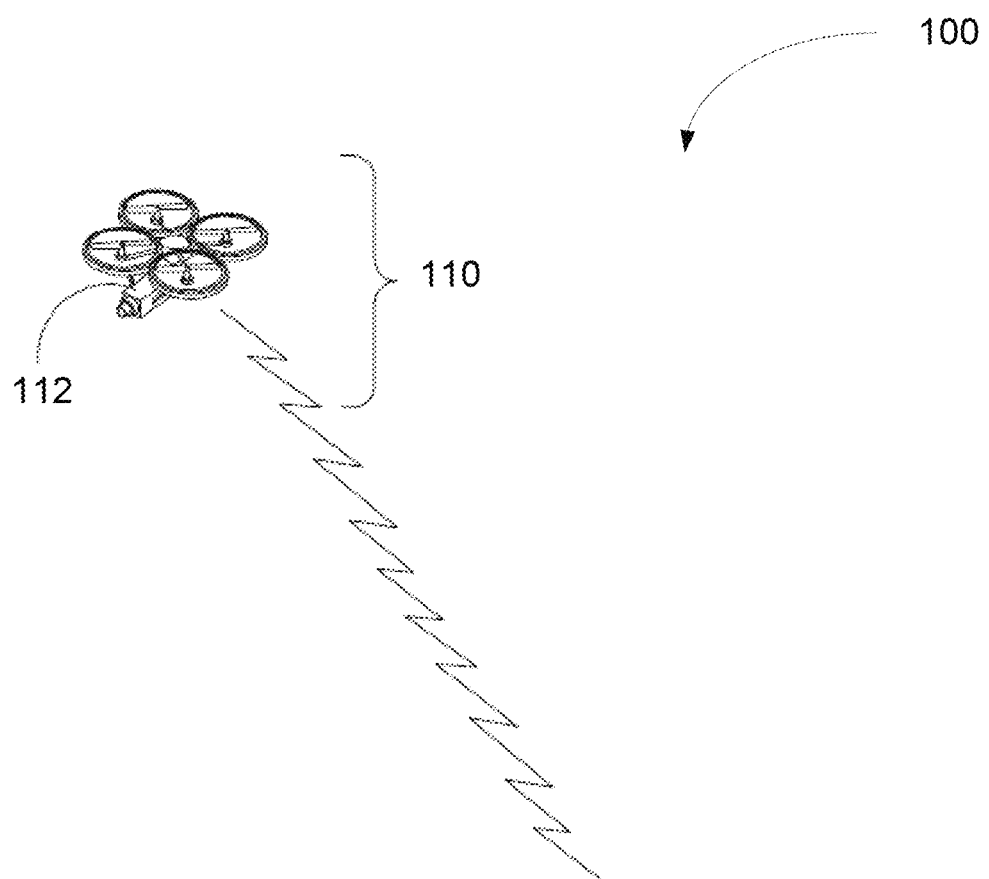
FIG. 1 is an exemplary embodiment of an image processing system configured to implement distortion correction, according to the inventive concepts disclosed herein.
Figure 1:
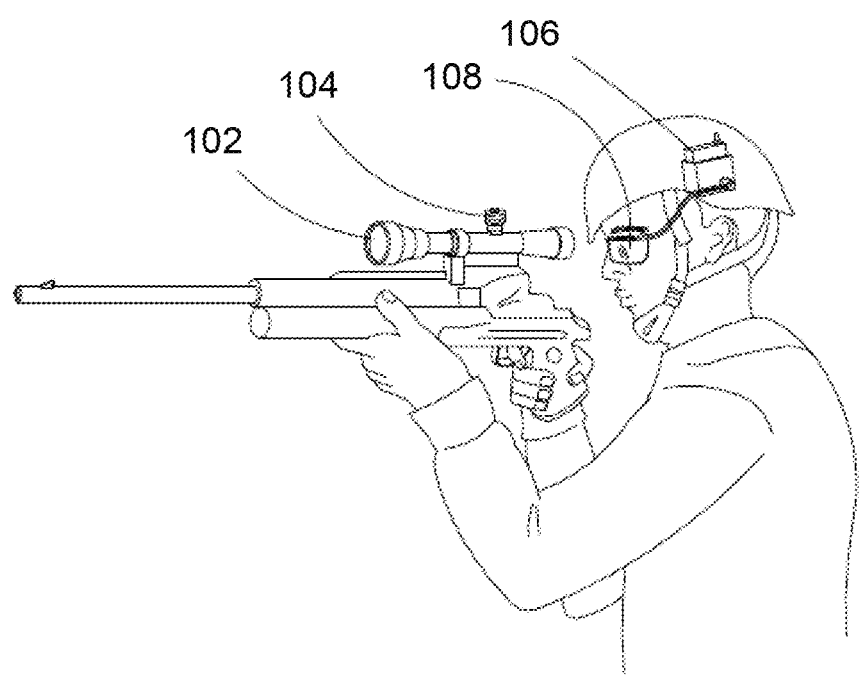

"Distortion" as used herein, means a deviation from an ideal image/video or a perfect perspective mapping of a captured scene. Distortion includes image affine transformations and more generally image warping such that straight lines are no longer straight, angles between lines are not preserved, and ratios of distances between points are not preserved.

"Dynamically configure" or "dynamically configurable" when used in conjunction with a component or a parameter of an apparatus or system means that the component or parameter may be adjusted (e.g., updated, exchanged via uploading, reconfigured, or combinations thereof) during operation of the system or apparatus, the adjustment occurring due to input parameters that are subject to change. For example, scene input parameters may depend on a number of external factors (lighting, noise conditions, proximity to landmarks/features, depth parameters, or combinations thereof) and configuration input parameters may depend on aspects of the system configuration (e.g., lens type, viewing angle, collection optics, or combinations thereof). Therefore, a component of a system or apparatus disclosed herein may be dynamically configurable to account for a change in the scene input parameters and the configuration input parameters.

"Interpolation" as used herein, is a method of constructing new data points within the range of a discrete set of known data points. In this regard, interpolation assumes there exists correlation between data points.

"Bilinear interpolation" as used herein, is essentially linear interpolation in two directions, which determines a value/address for a new pixel based on weighted averages of four neighborhood pixels that are proximal to the new pixel.

"Look-up Table (LUT)" as used herein, means a data structure for storing values such that a particular position in the LUT corresponds to a specific value.

"Configuration input parameters" as used herein means a collection of system input values according to sub-systems or components of the overall system (e.g., rotary wing airborne drone). These input values may include, but are not limited to, type of lens (e.g., concave, convex, positive meniscus, negative meniscus, or combinations thereof), parameters related to the lens (e.g., focal length, refractive index, radius of curvature, thickness, optical axis, number, or combinations thereof), a magnification factor, a type of aberration experienced by the system (e.g., spherical comatic, chromatic, barrel, pincushion, field curvature, or combinations thereof), presence or absence of an optical filter, type of optical filter, parameters related to the optical filter (e.g., transmitted wavelength, blocked wavelength, or combinations thereof), light emitting elements (e.g., light-emitting diodes (LEDs), infrared light emitters, lasers, or combinations thereof), type of system power (e.g., battery supplied, alternating current (AC), direct current (DC), solar, or combinations thereof), amount of available power, power requirements of system components or processes, type of optical system (e.g., 2D camera or 3D camera), type of photosensor (e.g., charge-coupled device (CCD) or complementary metal-oxide-semiconductor (CMOS) device for capturing light) or combinations thereof.

"Scene input parameters" as used herein means a collection of system input values as collected by an optical sub-system (e.g., camera) of the overall system (e.g., soldier mounted camera and display). These input values may include, but are not limited to, lighting, noise conditions, landmarks or features, proximity to landmarks or features, object tracking values (e.g., position, speed, linear acceleration, or combinations thereof), or combinations thereof.

"Sparse Matrix Table (SMT)" means a data structure for storing elements in matrix form. The elements stored make up only a portion of the total possible elements that could be stored in the matrix.

"SMT Compression ratio" as used herein means a ratio of a total number of interpolated input rows and columns to a value provided for interpolating. The SMT compression ratio associated with an SMT is configurable based on a distortion value of an input image, scene input parameters, configuration input parameters, or combinations thereof. The SMT compression ratio is associated with the current SMT used by, or uploaded into, the DC sub-system. The SMT compression ratio is also configurable based on latency constraints.

"Memory" as used herein, and unless otherwise specified, means any storage medium known in the art suitable for storing program instructions executable by the associated one or more processors and one or more databases. For example, memory may include, but is not limited to, a read-only memory, a random access memory, a magnetic or optical memory device (e.g., disk), a magnetic tape, a solid state drive and the like. In some embodiments, a memory is configured to store one or more SMTs for a power- and latency-constrained system. The memory includes non-transitory memory. In embodiments, the memory may be located remotely with respect to the system.

"Processor" as used herein means any processing device, including but not limited to, a microprocessor, an application specific integrated circuit (ASIC), a field programmable gate array (FPGA), a central processing unit, an arithmetic logic unit (ALU), a digital signal processor (DSP), or combinations thereof.

"Module," "block" or "sub-block" as used herein means a combination of hardware and software configured to perform one or more steps, processes and/or algorithms of the inventive concepts disclosed herein.

"SRAM" as used herein means static random-access memory and is a type of semiconductor memory that holds data as long as power is supplied to the memory. This type of memory does not need to be periodically refreshed. This type of memory includes multiple memory cells arranged in a matrix, constituting a memory array. Memory cells of the memory array incorporate flip-flop circuits.

"Buffering frame" as used herein means data received from an image/video source that is written into a buffer.

"Working frame" as used herein means data that is being read from a buffer. This data is read in an order specified by an SMT. The pointers q_base_addr, q_roffset, and q_raddr (defined below) are used in reference to the working frame. For a majority of the operation of the DC sub-system (defined below), the working frame and the buffering frame are substantially equivalent, with the q_roffset pointer lagging the q_woffset (defined below) pointer by a few lines. However, at frame boundaries, the working frame is briefly one frame behind (e.g., referencing the bottom of the previous frame, while the buffering frame is referencing the top of the next frame).

"RAM word" as used herein means a horizontal portion of RAM memory. Pixels are written to the buffer as they are received from the input source. Pixels are read from the buffer for interpolation, to provide the distortion-corrected output image. Multiple pixels are stored in a single RAM word to improve bandwidth. Using this scheme, an entire four-pixel neighborhood can be read for interpolation in only two RAM reads, in most cases. It is noted that each of the following are illustrative examples of separate RAM words with multiple (e.g., 8) pixels contained therein:
W1: [R0C0, R0C1, R0C2, R0C3, R0C4, R005, R0C6, R0C7]
W2: [R0C8, R0C9, R0C10, R0C11, R0C12, R0C13, R0C14, R0C15]
W3: [R1C0, R1C1, R1C2, R1C3, R1C4, R1C5, R1C6, R1C7]
W4: [R1C8, R1C9, R1C10, R1C11, R1C12, R1C13, R1C14, R1C15]

It is further noted that none of these examples are limiting. For example, a RAM word line may be adjusted according to any configuration of RAM memory, including but not limited to, an 8-pixel, 12-pixel or 16-pixel width.

"Pointer" as used herein means an indicator or reference used by a processor to access a buffer (e.g., pixel buffer).

"q_waddr" as used herein means the pointer indicating the current address in the PIXEL_INT buffer where input pixel data is written. This value increments by one with each write (i.e. it is a pixel index value).

"q_woffset" as used herein means the pointer indicating the pixel offset in the current input frame where data is being written into the buffer. Similar to q_waddr, this value is incremented by one with each write to the buffer; the difference is that q_woffset is reset to zero at the start of every new input frame. The pointer "q_woffset" is used for flow control between the read and write logic, not for actually addressing the memory.

"q_base_addr" as used herein means the pointer indicating the base address for the current frame in the PIXEL_INT buffer. This pointer is used to generate the read address value for the working frame. This value is derived from q_waddr; when a start-of-frame is seen on the write (e.g., buffering) side, the value of q_waddr is saved off into a register. When the working frame reaches the same start-of-frame a little later, the saved address is loaded into q_base_addr.

"q_roffset" as used herein means the pointer indicating the working frame for the current interpolation operation, with respect to q_base_addr; this is calculated from the coordinates requested by the ADDR_INT block (e.g., q_roffset=ROW x<image_width>+COL).

"q_raddr" as used herein means the pointer indicating the current pixel interpolation in the working frame (e.g., computed as q_raddr=(q_base_addr+q_roffset[MSb's]) modulo RAM_DEPTH). It is noted that only the most significant bits ("MSb's") of q_roffset are used; while q_roffset is a pixel offset, multiple pixels are stored in a single buffer word. This allows a four-pixel neighborhood to be fetched in only two RAM reads, as discussed above. The lower bits of q_roffset are used as a pixel offset to select the proper pixel from a RAM output word. In some embodiments, a similar addressing scheme can be used on the write side with "q_waddr".

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to high-speed video distortion correction for image processing systems. Image processing systems experience unique distortion patterns due to unique sets of configuration input parameters and scene input parameters. Thus, for each different set of optics, each different display, or any substantial variation in distance (e.g., a distance of image capturing optics relative to a display), a different distortion pattern may be experienced by the image processing system. A distortion correction (DC) sub-system is implemented within these image processing systems to quickly correct unique distortion patterns experienced by the image processing system, while staying within minimal power and latency constraints. The DC sub-system includes a dynamically configurable data structure (e.g., SMT) to provide input image mapping values from which distortion correction values (e.g., flow control parameters, pixel coordinates, and pixel intensities) are interpolated.

The DC sub-system includes a RAM buffer for temporarily storing the input image values. The RAM buffer is configured to utilize an amount of memory that is proportional to a unique amount of distortion (e.g., creating a sliding window effect). In some embodiments, this means that the latency of the system will be proportional to a worst-case distortion amount.

The SMT can be adapted in real-time to tune the correction function based on scene input parameters and configuration input parameters (e.g., creating at least a second sliding window effect). In some embodiments, the sliding window effects of the RAM buffer and the SMT allow a system designer to make flexible trade-offs between resources, power, and DC sub-system performance.

Implementation of a table-based correction function reduces overall memory requirements and latency by automatically receiving parameters from the SMT. Buffering proportionally to a distortion value of an input image further reduces latency by requiring only a fraction of the buffering employed in traditional designs. Additionally, the table-based correction function can model virtually any pattern, including but not limited to, rotations, zoom-in/zoom-out, non-linear transformations (e.g., pin-cushion, barrel, mustache, or combinations thereof), or combinations thereof.

Referring now to FIG. 1, an exemplary embodiment of an image processing system 100 configured to implement distortion correction includes an image/video source 102 (e.g., scope-mounted camera), a transmitter 104, a receiver 106, and a display 108. In an exemplary embodiment, the image/video source 102 may be omitted in lieu of a rotary wing aircraft (e.g., drone) 110 implementing an image/video source 112. In another exemplary embodiment, either of the image/video source 102 or the image/video source 112 may be omitted. In another exemplary embodiment, an image/video source may be user selectable between one or more image/video sources (e.g., the image/video source 102 or image/video source 112).

While FIG. 1 depicts system 100 as a soldier-mounted camera and display system or a rotary wing camera and display system, these depictions are not limiting. For example, embodiments of the image processing system 100 may be any one of a soldier mounted camera and display system, a rotary wing airborne drone system, a head mounted (HMD) display system (e.g., air traffic control (ATC) HMD), a handheld camera and display system (e.g., smart phone, PDA or tablet computer in a low power mode), or combinations thereof. The display 108 incorporated into the system 100 may be any one of an emissive display, goggles, a visor, a portable handheld display, or combinations thereof.

Figure 2:
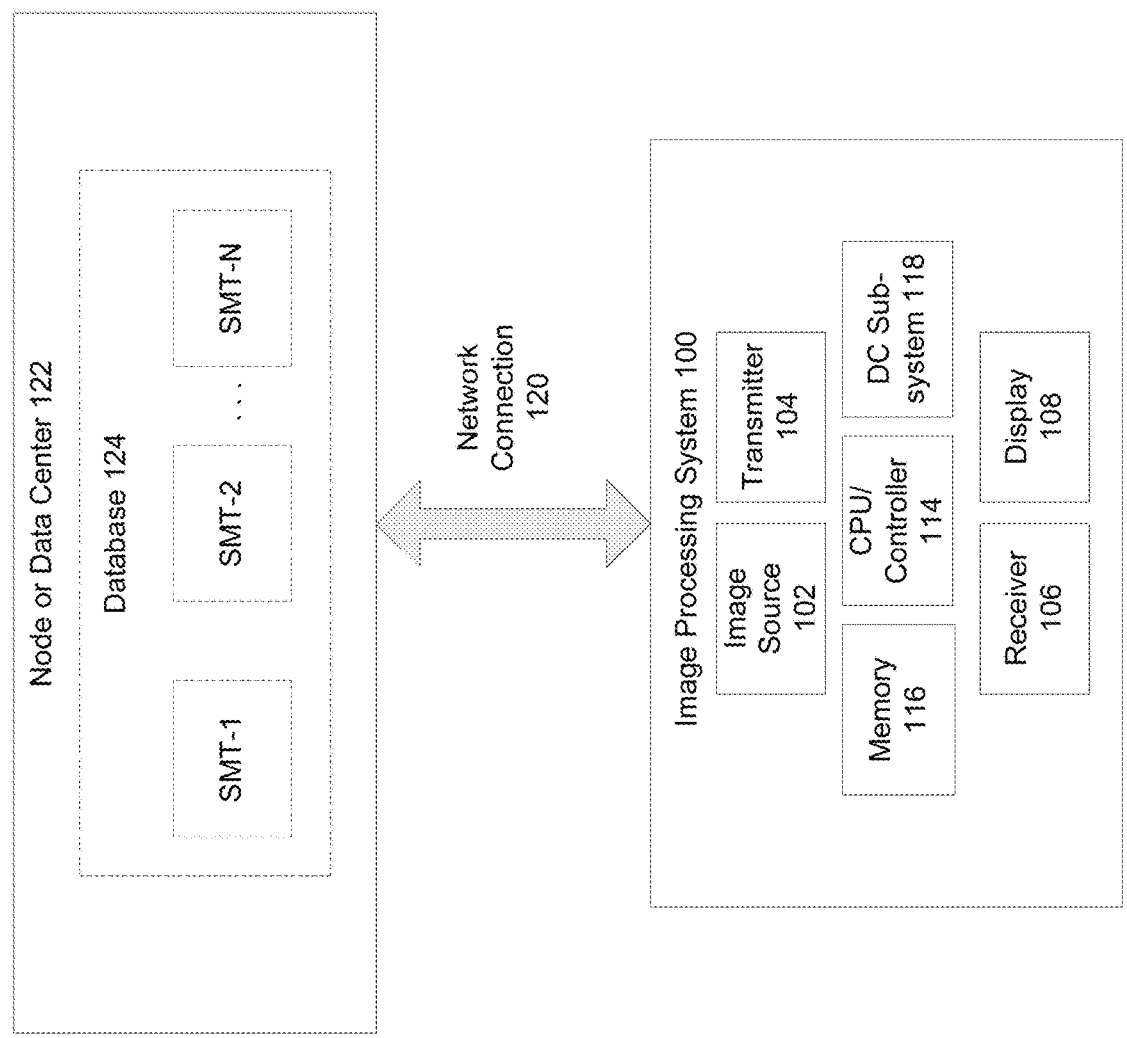
FIG. 2 is an exemplary embodiment of a block diagram of an image processing system configured to implement distortion correction, according to the inventive concepts disclosed herein.

Referring now to FIG. 2, an exemplary embodiment of the system 100, according to the inventive concepts disclosed herein, further includes a CPU/Controller 114, a memory 116 and a DC sub-system 118. The various components of system 100 may be interconnected by multiple signals (e.g., bi-directional, electric, digital, electromagnetic, or combinations thereof). In an exemplary embodiment, the DC sub-system 118 may be located with the transmitter 104 (e.g., system 100 transmits distortion corrected data). In another exemplary embodiment, the DC sub-system 118 may be located with the receiver 106 (e.g., receiving data that has distortion, which is to be corrected after reception).

In an exemplary embodiment, system 100 may be connected to a network through a network connection 120 to a node 122 of the network. In an exemplary embodiment, the node 122 is a data center with one or more databases 124. The one or more databases 124 may be stored in any suitable type of memory and may contain information for dynamically configuring the system 100. For example, the one or more databases 124 may include multiple data structures (e.g., SMTs), where each data structure has different entries to account for different amounts of distortion experienced. In some embodiments, system 100 may be pre-configured with a native SMT, and may be further configured to receive in real-time a new SMT for a new amount of distortion experienced by the system 100.

In some embodiments, the network establishing the network connection 120 may be configured to allow data to be exchanged between system 100 and other devices attached to the network (e.g., client, carrier or agent devices) or between nodes of the network (e.g., node 122). The network connection 120 can connect multiple networks including but not limited to Local Area Networks (LANs) (e.g., an Ethernet or corporate network), Wide Area Networks (WANs) (e.g., the Internet), wireless data networks, fiber optical networks, radio frequency communications networks and/or backplane busses (e.g., PCI express bus), other electronic data networks, or combinations thereof. In some embodiments, network connection 120 may be a wired or wireless connection (e.g., established by any suitable type of Ethernet network; telecommunications/telephony network, including an analog voice network or a digital fiber communications network; storage area network such as Fibre Channel SAN; any other suitable type of network and/or protocol; or combinations thereof).

In some embodiments, the data is exchanged between system 100 and other devices of the network according to one or more protocols. For example, the data exchange protocol may be an association control service element (ACSE) protocol, an ISO 8823/X.226 OSI presentation protocol (PRES), a session initiation protocol (SIP), a transport layer security protocol (TLS), a transmission control protocol (TCP or TCP/IP), other suitable protocol, or combinations thereof.

Figure 3:
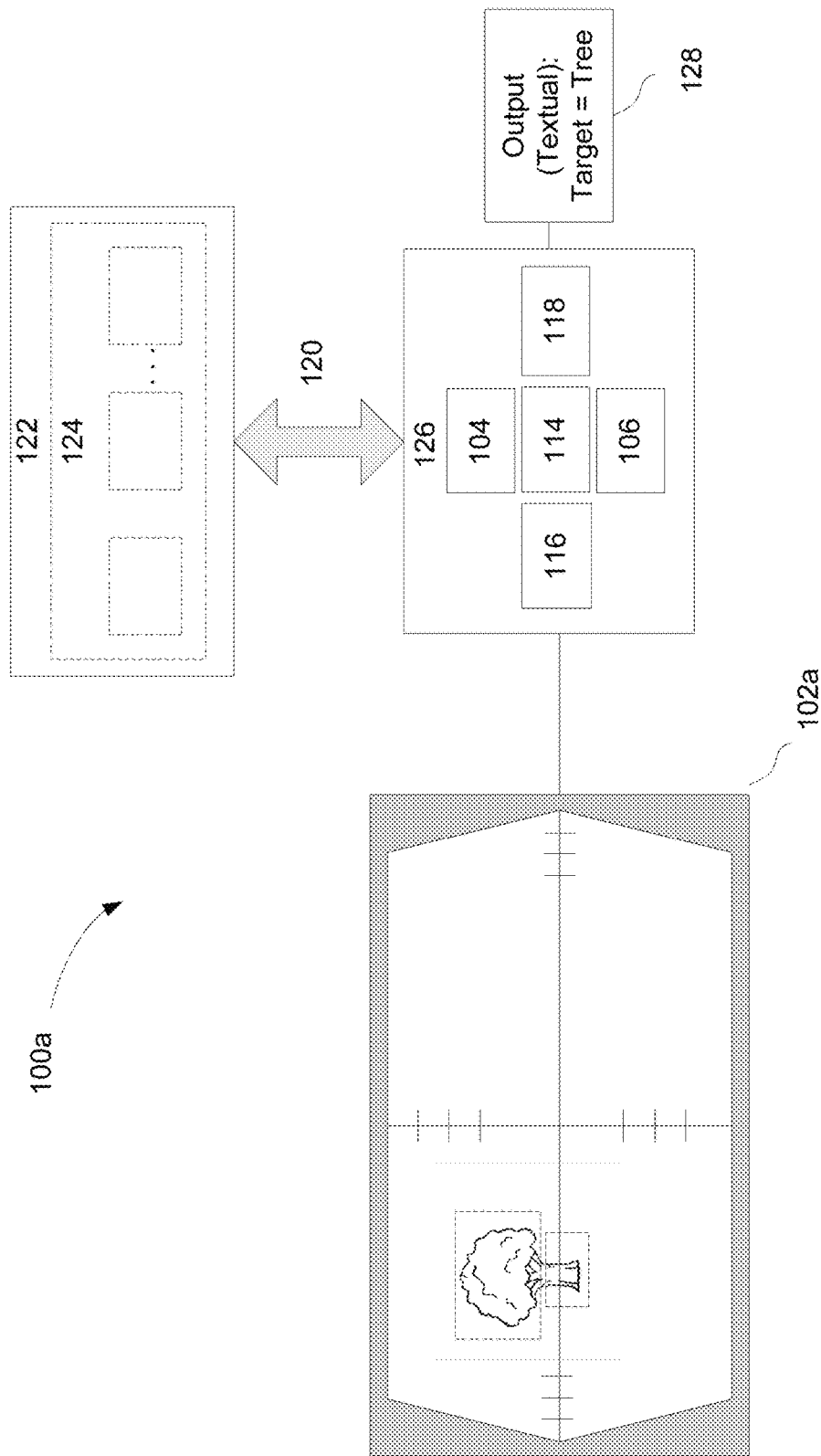
FIG. 3 is another exemplary embodiment of an image processing system configured to implement distortion correction, according to the inventive concepts disclosed herein.

Referring now to FIG. 3, an exemplary embodiment of system 100a includes an image/video source 102a, an image processing block 126, and an output sub-system 128. System 100a is implemented similarly to system 100 except that the system 100a does not incorporate a traditional display. For example, the image/video source 102a may be a component of a targeting system with distortion corrected data communicated to output sub-system 128 after being processed in image processing block 126. Although the image processing block 126 contains a DC sub-system 118, the distortion corrected images may never be communicated to a traditional display. For instance, the output sub-system 128 may be configured to generate a textual output, an audio output, locational/navigational output, or combinations thereof.

It is noted that while FIG. 3 depicts system 100a as a targeting system, this depiction is not limiting. For example, the system 100a may be implemented on or in multiple types of systems that do not use a traditional display, including but not limited to, targeting systems, boresighting systems, navigational systems, warning/alert systems, or combinations thereof.

For instance, an exemplary embodiment of system 100a may be used in boresighting any two sensors. In this embodiment, the first sensor may be a radar emitter (not shown) implemented on an aircraft body (e.g., aircraft 110) and used by the aircraft for object tracking or object imaging. The second sensor may be a radar antenna (e.g., radar receiver—also not shown). In an exemplary embodiment, the radar emitter emits pulses of electromagnetic energy, which are reflected from a surface (e.g., ground) and are received at the aircraft by the radar antenna. Variations in characteristics of the electromagnetic signals (e.g., amplitude) may indicate an alignment error in the radar emitter or radar antenna, accordingly one or more boresighting adjustments are made.

Figure 4:
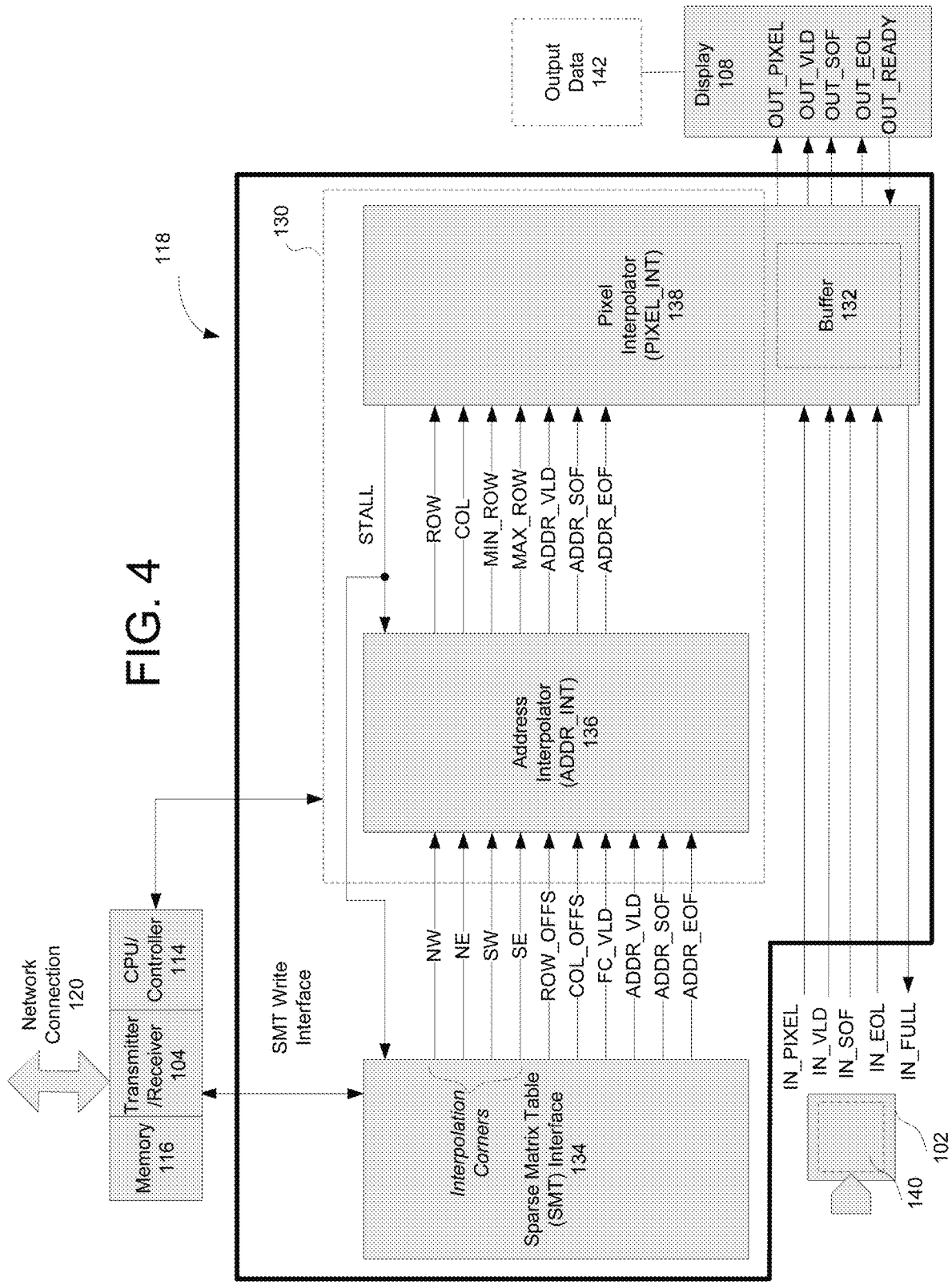
FIG. 4 is a block diagram of an exemplary embodiment of a distortion correction (DC) sub-system, according to the inventive concepts disclosed herein.

Referring now to FIG. 4, an exemplary embodiment of a DC sub-system 118 according to the inventive concepts disclosed herein includes a processor 130, a buffer 132, and a data structure 134. In an exemplary embodiment, the data structure 134 is a look up table (LUT). In another exemplary embodiment, the LUT is an SMT.

An exemplary embodiment of the DC sub-system 118 may be communicatively coupled to the image/video source 102, the transmitter/receiver (e.g., transceiver) 104, the display 108, the CPU/Controller 114, and the memory 116. The DC sub-system 118 may be further communicatively coupled via the network connection 120 to the network node 122 or the database 124 to dynamically configure the SMT 134.

In an exemplary embodiment, the processor 130 is configured to access entries of the SMT 134, an address interpolator block (ADDR_INT) 136, a pixel interpolator block (PIXEL_INT) 138, and input image data 140. In another exemplary embodiment, the processor 130 is further configured to communicate output data 142 to the display 108.

Figure 5:
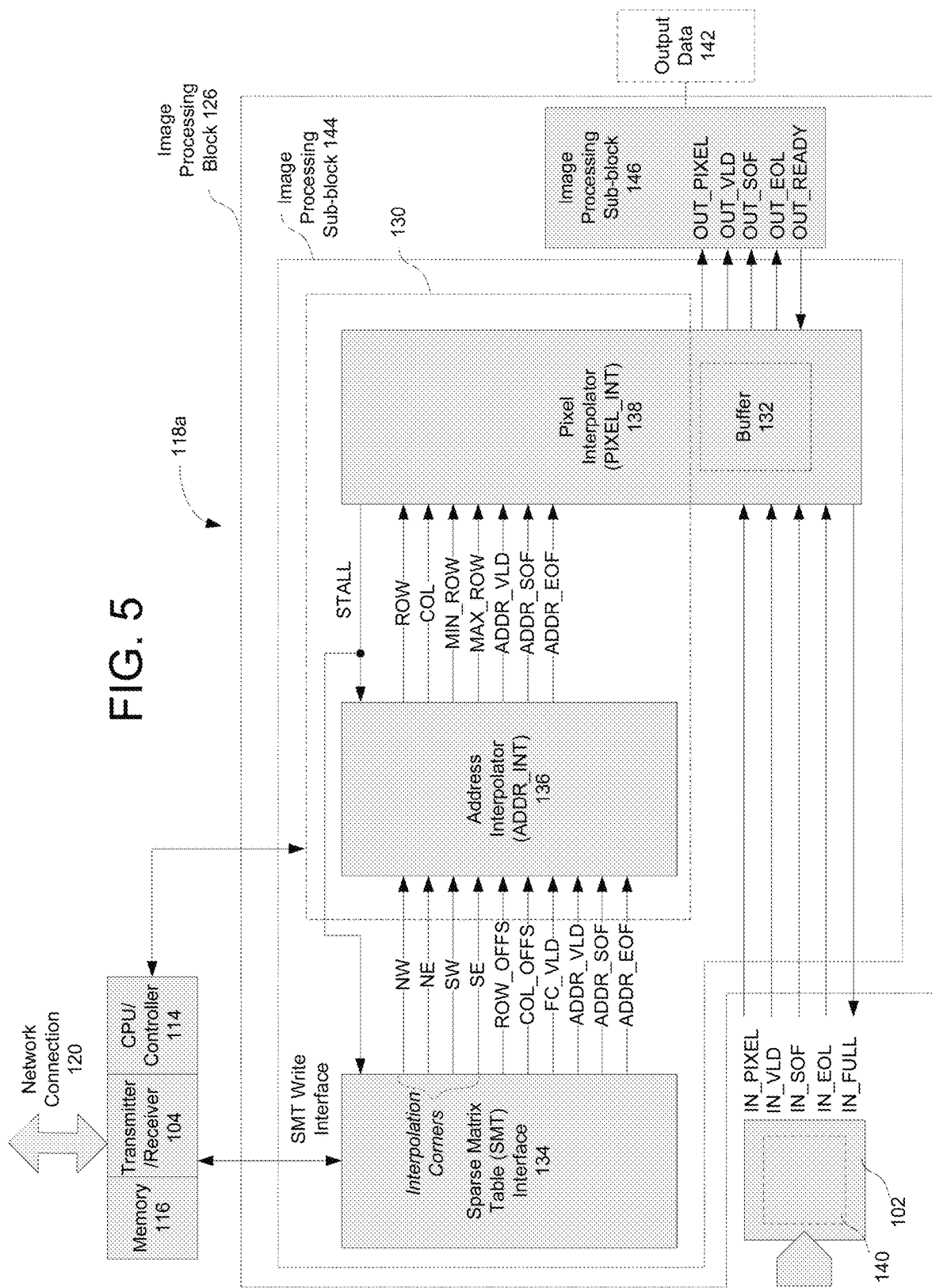
FIG. 5 is a block diagram of another exemplary embodiment of a DC sub-system, according to the inventive concepts disclosed herein.

Referring now to FIG. 5, an exemplary embodiment of a DC sub-system 118a according to the inventive concepts disclosed herein is implemented similarly to the DC sub-system 118 except that system 118a may not necessarily include a traditional display (e.g., display 108), and/or system 118a may include the image processing block 126, a first image processing sub-block 144 and a second image processing sub-block 146.

It is noted that although FIGS. 4-5 depict image/video source 102, CPU 114, and processor 130 as separate blocks/units of the DC sub-system 118 or 118a, this depiction is not limiting. For example, in an exemplary embodiment the image/video source 102, the CPU 114, and/or the processor 130 may be at least partially combined to form a common processing device.

Figure 6:
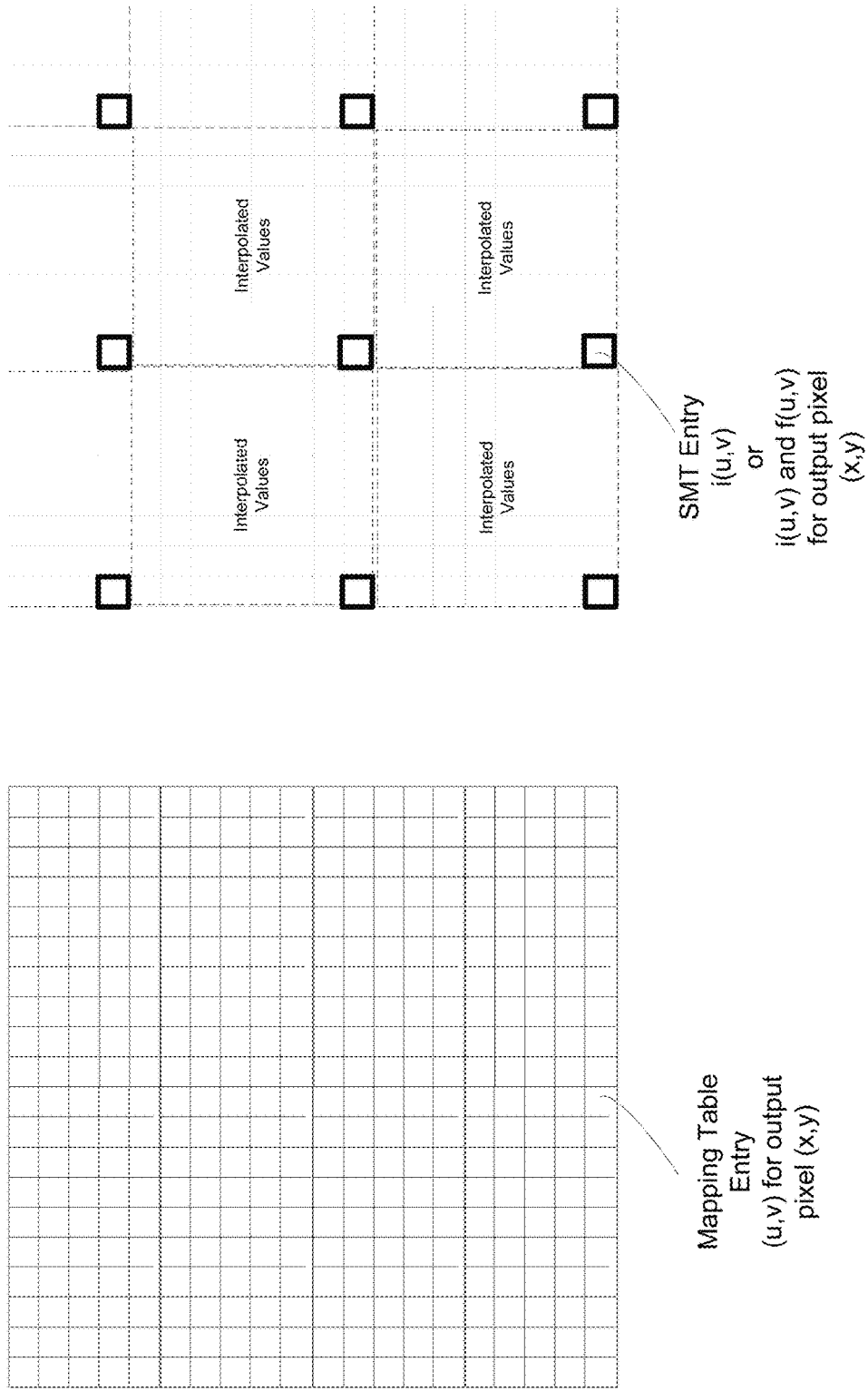
FIG. 6 is an exemplary embodiment of an organizational scheme of a sparse matrix table (SMT), according to the inventive concepts disclosed herein.
Figure 7:
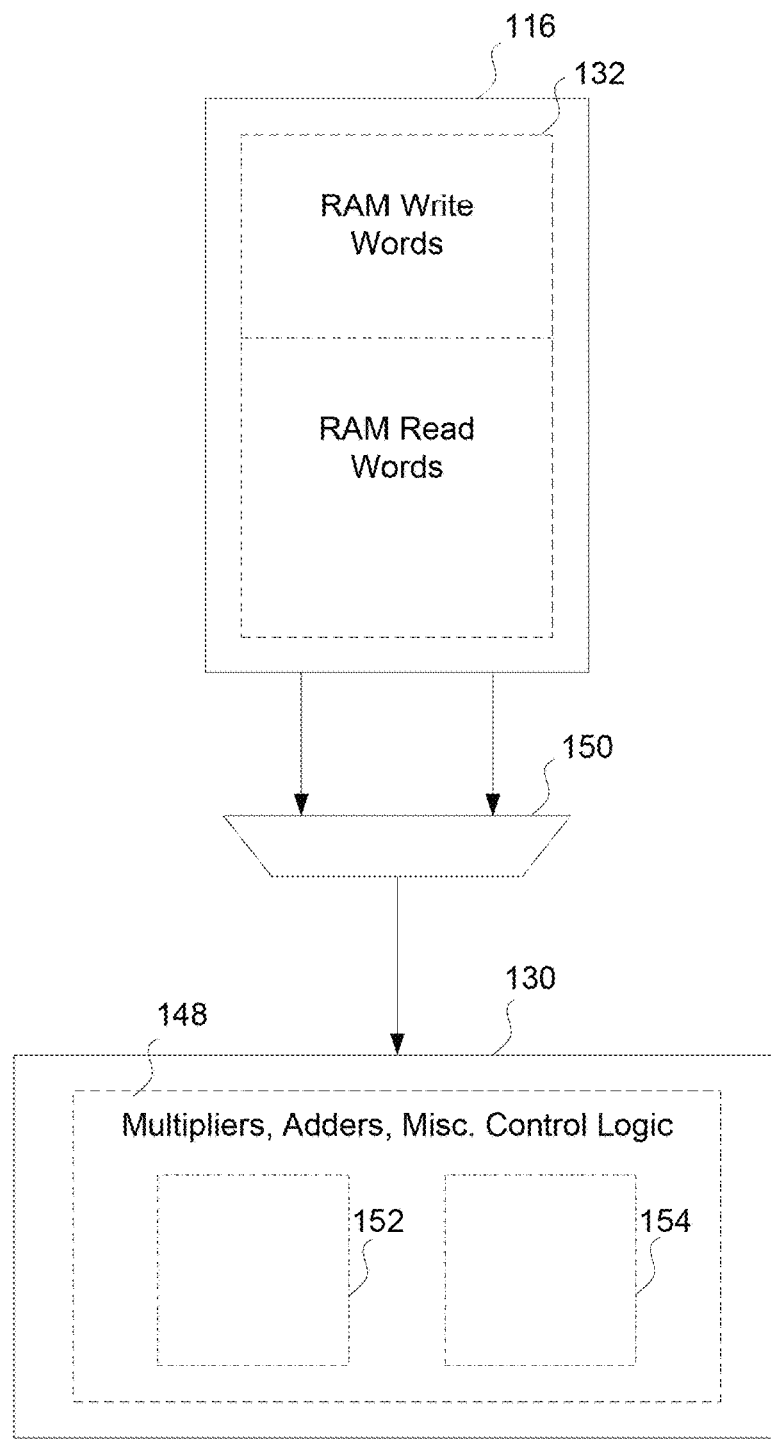
FIG. 7 is a block diagram of an exemplary embodiment of a buffer, a processor, and a compare-and-select circuit, according to the inventive concepts disclosed herein.

Referring now to FIG. 6, a compression ratio of the SMT 134 is illustrated. In an exemplary embodiment, the SMT 134 and the processor 130 implement an inverse mapping process. Inverse mapping provides an algorithm to determine an output image coordinate (x, y) from multiple corresponding input image coordinates (u, v). As discussed in the inventive concepts disclosed herein, an interpolation method occurs to derive the output image coordinate from neighborhood input image coordinates. In other words, rather than a one-to-one mapping, there is a one-to-X mapping, where "X" is a number of coordinates less than the total possible number of input coordinates that may be used to generate output coordinates. This compressed approach reduces an amount of memory that otherwise would be necessary to generate output coordinate mapping for distortion correction. In one or more of the illustrative examples used herein, the compression ratio is depicted as a 64:1 compression ratio (e.g., for every 8 rows and 8 columns an SMT entry is provided). It is noted that this depiction is not limiting, and that persons of skill in the art will be able to recognize multiple suitable compression ratios suitable for a DC sub-system 118 (e.g., any N×N:M SMT compression ratio, where M N), according to the inventive concepts disclosed herein.

Referring again to FIG. 6, the SMT 134 includes multiple entries that provide pixel mapping values. In an exemplary embodiment, the mapping values include pixel coordinate values. In another exemplary embodiment, the mapping values include both flow control parameters and the pixel coordinate values. In an exemplary embodiment, an entry includes an integer value (i). In another exemplary embodiment, a first portion of an entry includes an integer value (i) and a second portion of an entry includes a fractional value (f). The fractional coordinate values minimize rounding errors in interpolation. In an exemplary embodiment, the fractional value portion of an entry is limited to four bits.

In some embodiments, the precision of the DC sub-system 118 may be tuned for fractional bit-precision and SMT compression ratio.

In an exemplary embodiment, the mapping values (e.g., flow control parameters and pixel coordinates) are embedded in the SMT 134. In another exemplary embodiment, only the pixel coordinate values are embedded in the SMT 134 and the flow control parameters are generated by a separate flow control directive module/block (not shown, and located internal to system 100 or external and communicatively coupled to system 100), which communicates the flow control parameters prior to interpolating the pixel coordinate values in order to ensure proper interpolation of the input pixel coordinate values.

Referring now to FIGS. 4-7, an exemplary embodiment of the processor 130, according to the inventive concepts disclosed herein, includes any suitable processing device capable of executing instructions retrieved from memory. In an exemplary embodiment, the memory is SRAM. In another exemplary embodiment, the memory is multi-port RAM (e.g., dual-port RAM).

In an exemplary embodiment, the buffer 132 and combinational logic 148 are implemented within the SRAM. In an exemplary embodiment, the combinational logic 148 includes a first combinational logic circuit 152 for the ADDR_INT 136 and a second combinational logic circuit 154 for the PIXEL_INT 138. In an exemplary embodiment, the first combinational logic circuit 152 operates simultaneously with the second combinational logic circuit 154 to maintain a high pixel rate required for HD video.

In an exemplary embodiment, the buffer 132 is a circular buffer. The buffer 132 may be sized according to an amount of distortion (e.g., maximum distortion) and according to a color encoding scheme selected (e.g., RGB24 with 8 bits in three color channels with values from 0 to 255 or RGB32). In an exemplary embodiment, the DC sub-system tailors the circular buffer (e.g., buffer 132) to temporarily store first input image values as required for correcting the unique amount of distortion. Then, the first input image values are overwritten by second (e.g., new) input image values from the same frame when the first input image values are no longer needed, reducing overall latency of the system.

In an exemplary embodiment, the buffer 132 is sized to accommodate a worst-case vertical distortion. For example, a depth of the circular buffer is equal to a height of an image multiplied by an amount of distortion experienced by system 100. For instance, with a 1080p video stream with 24-bit color and 6% vertical distortion experienced, a 373 kB buffer is utilized. In an exemplary embodiment, the buffer 132 has a 32-pixel RAM word width (i.e., the RAM is 256 bits wide with one pixel being 8 bits). However, it is noted that the width of the buffer 132 is also configurable depending on factors including, but not limited to, the color encoding scheme and an amount of distortion experienced.

In an exemplary embodiment, the combinational logic 148 is coupled to the buffer 132. The buffer 132 may be configured such that for every one RAM write an integer multiple of RAM reads are processed (e.g., y=2x and/or y=4x, where y is the number of reads and x is the number of writes). In an exemplary embodiment, the buffer 132 is the PIXEL_INT 138 buffer (discussed below), and is generally only a fraction of the size of an entire image frame (e.g., old image data from a frame is overwritten with newer data from the same frame once it is determined that the older data is no longer needed for interpolation).

In an exemplary embodiment, a compare-and-select circuit 150 (e.g., multiplexer) may be positioned between the buffer 132 and the combinational logic 148 in order to select pixel coordinates communicated from the buffer 132 that are outside a range or threshold value and zero the respective out-of-range pixel coordinates (e.g., so that they appear black in the output image).

For example, in many image processing systems the worst-case distortion is in the far corners of the scene, and this distortion drives the size of the input pixel buffer, the dominant resource consumer in the system. With the sliding window effects of the DC sub-system 118, a designer can trade off correcting a few pixels in the extreme corners of the image in exchange for significant reduction in the size of buffer 132. For instance, the DC sub-system 118 may be configured to black out the non-corrected corner pixels by minimum and maximum bounds checks. Such a design choice may be scarcely noticeable to an end user due to limits in peripheral vision. This type of design choice may also reduce the latency of the system 100 and/or components of the system 100. Moreover, since the SMT 134 and its flow control parameters are dynamically configurable, the DC sub-system 118 allows for easy experimentation with these tradeoffs.

In an exemplary embodiment, the combinational logic 148 includes multipliers (e.g., ten multipliers), adders and miscellaneous control logic. In some embodiments, the ADDR_INT block 136 and the PIXEL_INT block 138 may share components of the combinational logic 148. In an exemplary embodiment, the combinational logic 148 is configured to perform an interpolation process. In another exemplary embodiment, the combinational logic 148 is configured to perform three or more interpolation processes (e.g., a first process for flow control parameters, a second process for pixel coordinate values, and a third for pixel intensity values).

In an embodiment, according to the inventive concepts disclosed herein, an interpolation process implemented by the combinational logic 148 is bilinear interpolation. Nevertheless, the use of bilinear interpolation is not limiting. For example, the interpolation method may include bi-cubic interpolation, Lanczos interpolation, trilinear interpolation (e.g., for 3D), other interpolation methods known to those skilled in the art, or combinations thereof.

In some embodiments, the combinational logic 148 includes one or more decoders, one or more encoders, one or more multiplexers, or combinations thereof. In an exemplary embodiment, the one or more decoders include, but are not limited to, one or more AND-based decoders, one or more NOR-based decoders, or combinations thereof. For example, the one or more decoders may include a row decoder and a column (e.g., MUX) decoder.

Figure 8:
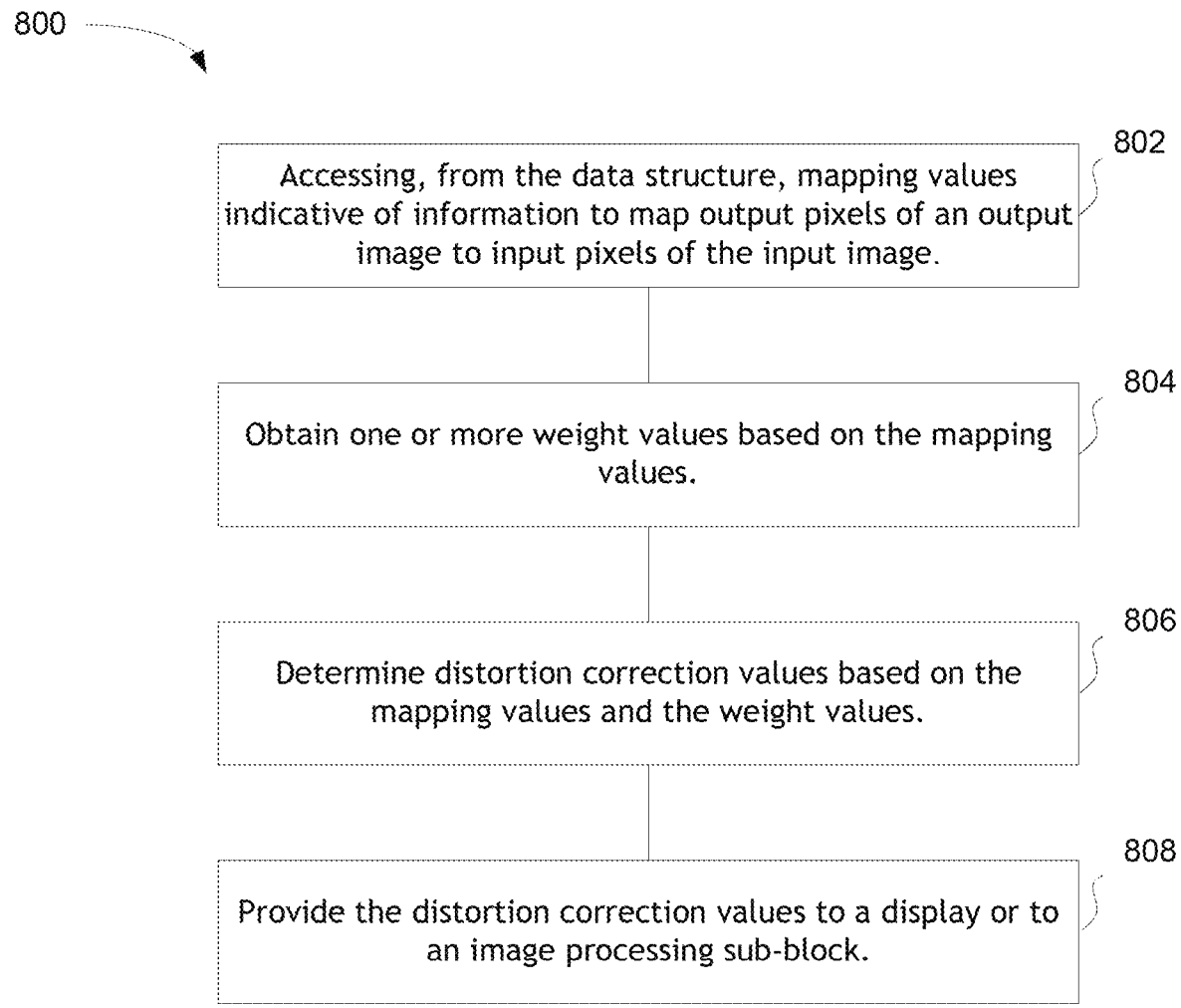
FIG. 8 is a process diagram of an exemplary embodiment of a DC method, according to the inventive concepts disclosed herein.

Referring now to FIG. 8, an exemplary embodiment of a method 800 according to the inventive concepts disclosed herein may include one or more of the following steps.

A step 802 may include accessing, from the data structure 134, mapping values indicative of information to map output pixels of an output image to input pixels of the input image. In an exemplary embodiment, the mapping values including flow control parameters and pixel coordinate values. In an exemplary embodiment, the mapping values are accessed when input image data 140 is available to the system 100. Thus, if no input image pixel values are available for interpolation, DC sub-system 118 is configured to stall (e.g., PIXEL_INT 138 coordinates stall commands as discussed below).

In an exemplary embodiment, the ADDR_INT block 136 is configured to access the mapping values from SMT 134. In an exemplary embodiment, the ADDR_INT block 136 may direct the processor 130 to retrieve first mapping values (e.g., flow control parameters) for a row, and then retrieve second mapping values (e.g., pixel coordinate values) for that row. For instance, referring now to FIG. 9, the flow control parameter values [0 . . . 16] may be obtained for row 8, and the values [8 . . . 24] for row 16. This means that output row 8 will use pixels from input rows 0 to 16, and output row 16 will use pixels from input rows 8 to 24. These flow control parameters tell the PIXEL_INT block 138 (as discussed below) a number of input rows required to be valid in the buffer 132 in order to process a respective output row to produce output data 142. They also allow the PIXEL_INT 138 to dynamically manage its circular buffer (e.g., buffer 132) and ensures that the input pixels are not overwritten until they are no longer required for interpolation. Furthermore, the use of flow control parameters enables a streaming operation that minimizes latency in system 100. It is noted that, in some embodiments, flow control parameters may not be required if a row of an input image includes the same number of pixels as the RAM buffer is configured to hold in a RAM word.

In an exemplary embodiment, where the SMT 134 has only pixel coordinate values embedded therein, a separate flow control directive module (not shown) may be included in the DC sub-system 118 to determine (e.g., compute based on coordinate mapping scheme embedded in an uploaded SMT) flow control parameters upon initialization or re-initialization of the DC sub-system 118 and communicate those values to the processor 130. In another exemplary embodiment, the ADDR_INT 136 may coordinate obtaining the flow control parameters from the flow control directive module so that pixel values may be properly interpolated.

In an exemplary embodiment, the processor 130 may be configured to recognize one or more asserted flags 158. For example, in an exemplary embodiment where a same combinational logic circuit (e.g., circuit 152) performs two or more interpolation processes, the asserted flags 158 enable the processor to recognize what type of values are being interpolated. For instance, the processor 130 and the combinational logic circuit 152 may be used to interpolate first, the flow control parameters, and then the input pixel coordinates. When interpolating the flow control parameters the asserted flag 158 may be an FC_VLD flag to indicate the values in the SMT 134 are flow control parameters, and when interpolating pixel coordinate values an ADDR_VLD flag may be asserted to indicate that the values are pixel coordinate values. It is noted that where the combinational logic circuit 152 is configured to perform only a single interpolation process (e.g., only interpolating pixel coordinate values), asserted flags may not be necessary because the processor 130 recognizes that the combinational logic circuit is dedicated to the single interpolation process.

Figure 9:
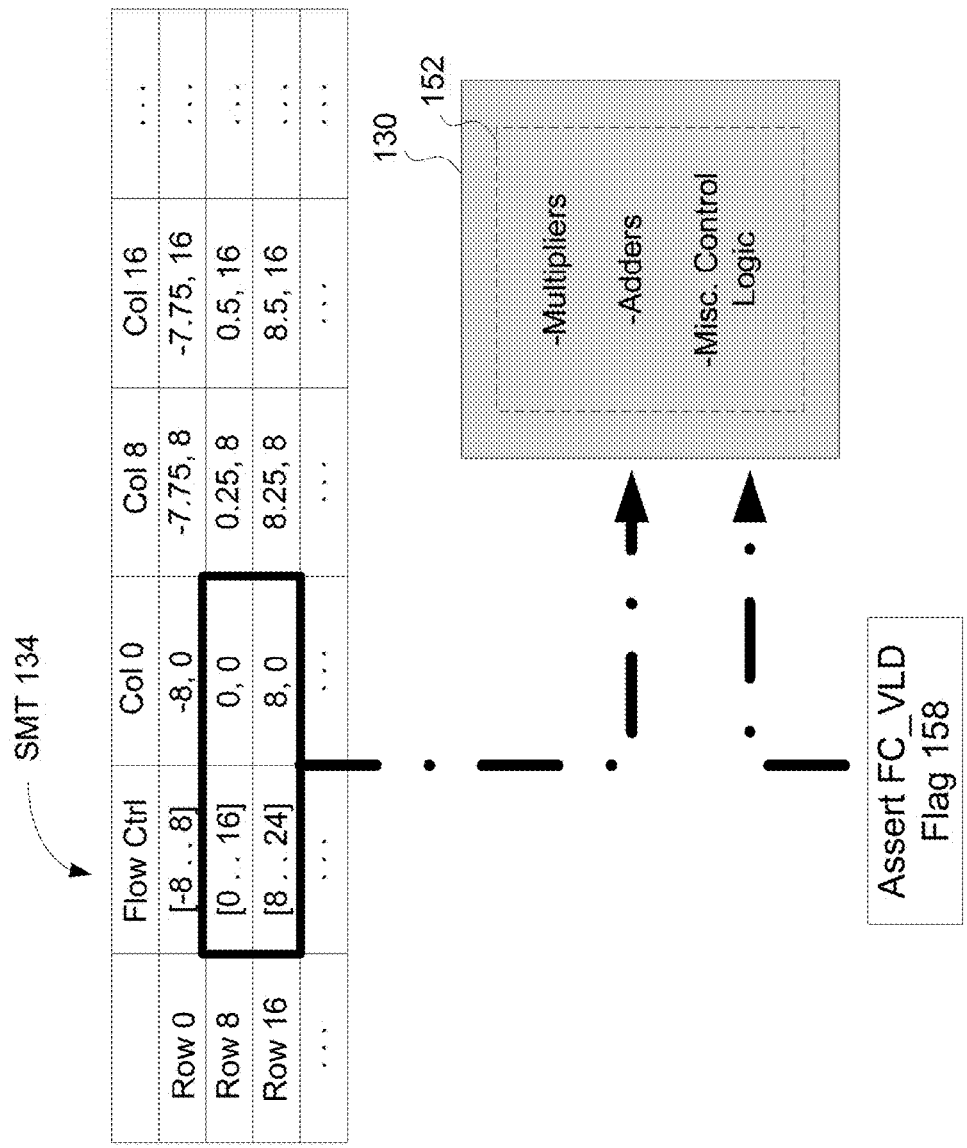
FIG. 9 is an exemplary embodiment of an operation of an SMT and an address interpolator (ADDR_INT), according to the inventive concepts disclosed herein.

It is noted that while the embodiment of SMT 134 depicted in FIG. 9 assumes a 64:1 compression ratio (e.g., see FIG. 6), in another exemplary embodiment, the SMT compression ratio is configurable. Furthermore, while the values in SMT 134 of FIG. 9 are based on an assumption of a simple, vertical distortion (e.g., six percent distortion only in the Y-direction), the SMT 134 may be dynamically configured to correct virtually any distortion value. For example, with a larger percentage of distortion, the SMT compression ratio may be reduced (e.g., 16:1 instead of 64:1) and a different SMT 134 (e.g., with different mapping values) may be uploaded into system 100, corresponding to the reduced SMT compression ratio.

Referring again to FIG. 9, in an exemplary embodiment, the processor 130 is configured to obtain pixel coordinate mapping values after obtaining the flow control parameter values. For example, SMT 134 maps output pixel (R8, C8) to input pixel coordinate (R0.25, C8) and output pixel (R8, C16) to input pixel coordinate (R0.5, C16). These input pixel coordinate values may be obtained after obtaining the flow control parameters, [0 . . . 16] and [8 . . . 24].

In some embodiments, portions of step 802 may be stalled. For example, if the working frame does not have the necessary input pixel values required for interpolation, the working frame may be stalled while the buffering frame retrieves the necessary input pixel values.

Referring again to FIG. 8, a step 804 may include obtaining one or more weight values based on the accessed mapping values. For example, the weight values may be from one or more LUTs (e.g., LUTs 156—discussed below) based on row and/or column offsets from a neighborhood pixel value (e.g., NW, NE, SW, or SE with bilinear interpolation).

Figure 10:
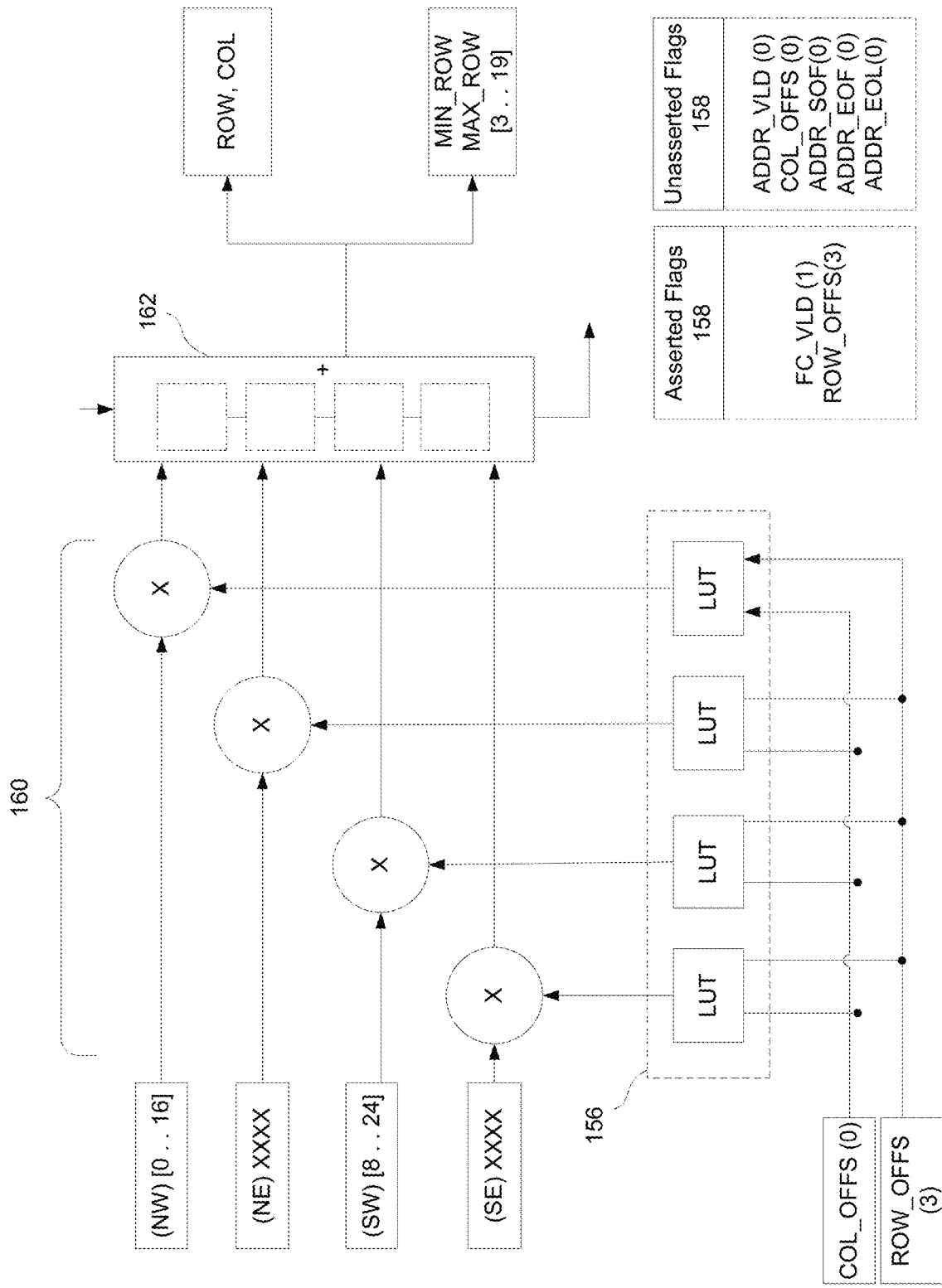
FIG. 10 is an exemplary embodiment of an operation of the ADDR_INT, according to the inventive concepts disclosed herein.

Referring now to FIGS. 9-10, an exemplary embodiment of an ADDR_INT 136 configured to obtain one or more weight values includes the processor 130 and the combinational logic circuits 152. In an exemplary embodiment, the combinational logic circuits 152 includes multipliers 160 and adder 162. It is noted that adder 162 may include multiple adders (e.g., full and/or half adders) according to the bit precision of the DC sub-system 118 (e.g., if SMT 134 includes fractional entries-4 bits—then the adder 162 may include four full adders). In an exemplary embodiment, the ADDR_INT 136 is configured to obtain one or more weight values from LUTs 156 based on row and/or column offset values. For example, processor 130 may be preparing to process output row 11 using values received from SMT 134 as depicted in FIGS. 9-10.

In this example, the operations indicated in FIG. 10 are directed towards a first cycle of the processor 130 in processing an output row of a mapped image frame (e.g., as mapped by SMT 134). During the first cycle, SMT 134 fetches flow control parameters and outputs them while asserting the FC_VLD flag 158, indicating that the current outputs from SMT 134 are flow control parameters and not pixel coordinate mapping values. It is again noted that the assertion of the FC_VLD flag 158 is only required if the combinational logic circuit 152 performs two or more interpolation processes.

In an exemplary embodiment, one or more offset values may be provided by accessing the SMT 134 (e.g., column offset=0 and row offset=3), which are used to lookup weight values in the LUTs 156 for determining unspecified flow control parameters. For example, since flow control parameters are not supplied by SMT 134 for row 11, and flow control parameters are specified for rows 8 and 16 (e.g., NW and SW neighbor values) the FC_VLD flag 158 and the COL_OFFS flag 158 is asserted and interpolation coefficients (e.g., 0.375 for SW and 0.625 for NW) are found in corresponding LUTs 156. The values of the LUTs 156 may be calculated based on the offsets. For example, the weight (e.g., as found in a LUT of LUTs 156) for the NW neighbor of the flow control parameter for row 11 (e.g., R8,C0) for output pixel R11,C0 may be calculated as follows:

$$\frac{(8 - COL_{OFFS}) * (8 - ROW_{OFFS})}{64} = 0.625 \qquad (1)$$

where COL_OFFS=0 and ROW_OFFS=3.

In an exemplary embodiment, first, second and third weight values are obtained depending on the interpolation process being performed. In some embodiments, the LUT 156 may comprise multiple LUTs, with each LUT corresponding to the type of weight value being obtained (e.g., first, second or third weight value).

As indicated above, the weight for a pixel is based on the SMT compression ratio used in constructing the SMT 134 (e.g., 64:1 used above) as well as the row offset of the row for which the unspecified flow control parameter is sought (e.g., how near the interpolated value is to the SMT supplied value). Therefore, in some embodiments, the weight values may be adjusted (e.g., decreased or increased) by adjusting the SMT compression ratio.

Adjusting the SMT 134, including the SMT compression ratio, can be performed in real-time to tune the correction function based on scene input parameters and configuration input parameters. For example, in extremely noisy environments, Moiré patterns can emerge in the output due to spreading the noise via interpolation. In these environments, increasing the weighting for closer pixels can result in a better interpolation. The dynamically-loadable nature of the SMT 134 allows for the image processing system 100 to be dynamically tuned to such environments based on the scene. In some embodiments, the DC sub-system 118 can be configured to automatically switch to a different set of interpolation coefficients based on one or more scene input parameters (e.g., the average brightness of the scene) by uploading a different SMT to replace SMT 134.

Referring again to FIG. 8, a step 806 may include interpolating distortion correction values based on the mapping values and the weight values obtained. Because the distortion correction values may include first distortion correction values (e.g. flow control parameters), second distortion correction values (e.g., pixel coordinate values), and third distortion correction values (e.g., pixel intensity values), step 806 may include three interpolation processes corresponding to the distortion correction value interpolated. In an exemplary embodiment, the weight values obtained in step 804 are used as interpolation coefficients.

In an exemplary embodiment, the first interpolation process uses the first weight values and flow control parameters 156 to determine MIN_ROW and MAX_ROW values. The MIN_ROW and MAX_ROW values may be used by the PIXEL_INT 138 as directives for interpolating pixel coordinate values and pixel intensity values.

In an exemplary embodiment, the ADDR_INT 136 accesses the first two entries of SMT 134, which include flow control parameters. Unspecified flow control parameters are then interpolated using weighted multiply-and-add interpolation.

Thus, the results of the first interpolation process indicate flow control parameters for R11C0 are [3 . . . 19]. Because flow control parameters are being received from the SMT 134 and interpolated in the combinational logic circuit 152 (e.g., which includes the multipliers 160 and the adder 162), an FC_VLD flag 158 is asserted.

Figure 11:
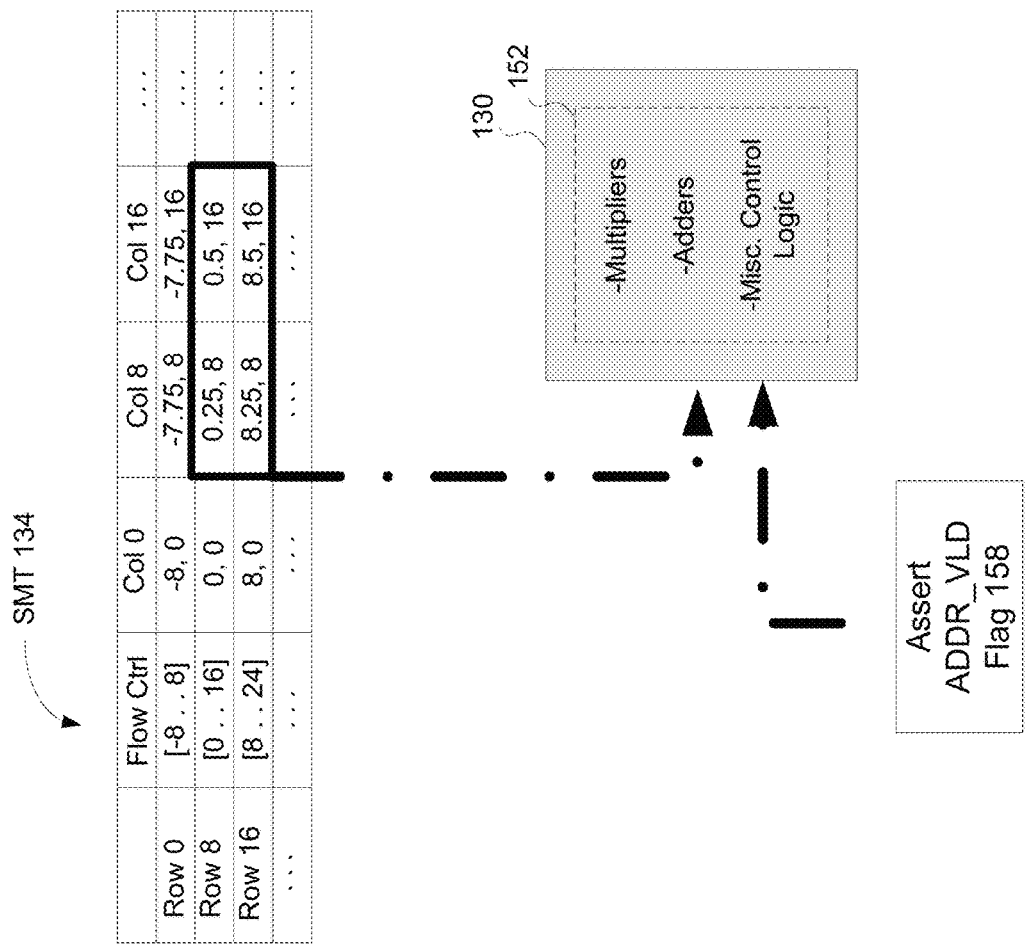
FIG. 11 is an exemplary embodiment of an operation of the SMT and the ADDR_INT, according to the inventive concepts disclosed herein.
Figure 12:
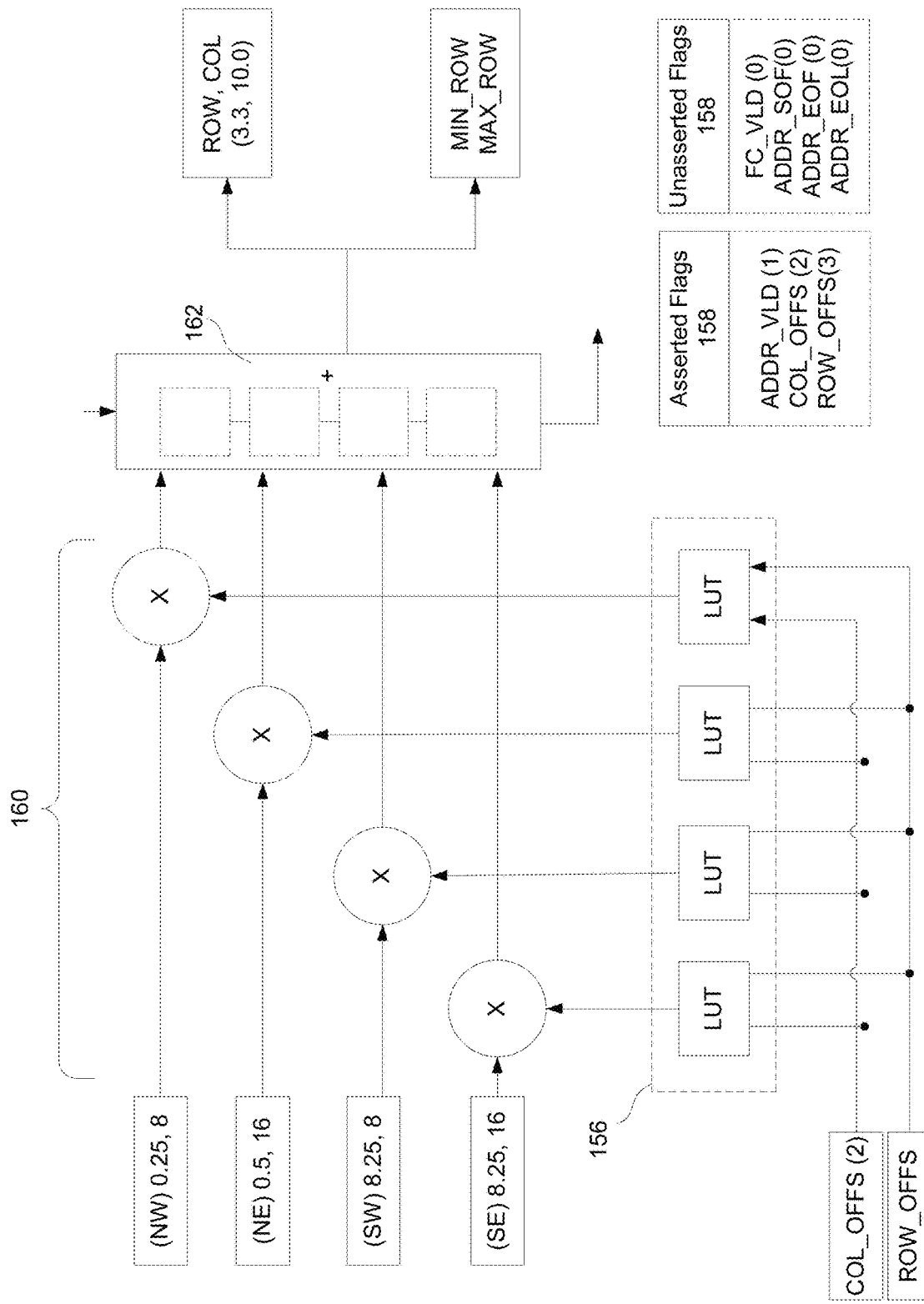
FIG. 12 is an exemplary embodiment of the ADDR_INT, according to the inventive concepts disclosed herein.

Still in step 806 and referring now to FIGS. 11-12, processor 130 accesses a neighborhood of pixel coordinate values from SMT 134 in order to interpolate (e.g., via bilinear interpolation, which would require four values) unspecified input pixel coordinate values. The second interpolation process is similar to the first, and in some embodiments, uses the same combinational logic circuit 152 (e.g., including the multipliers 160 and the adder 162). In some embodiments, the second interpolation process differs from the first in that the second interpolation process involves asserting a different flag 158 (e.g., ADDR_VLD instead of FC_VLD).

For example, the ADDR_INT block 136 may be configured to retrieve the neighborhood of pixel coordinate values (e.g., NW, NE, SW, and SE) and row/column offsets from the SMT 134 for interpolating an input pixel coordinate. In some embodiments, input pixel coordinate values retrieved for the neighborhood of pixel coordinate values are fractional. In an exemplary embodiment, the level of bit-precision of the fractional coordinates is configurable. The interpolation coefficients used by the ADDR_INT 136 are obtained using a process similar to the process used in Equation (1), except that a different LUT may be used.

For example (continuing the example used above), the weight for the NW neighbor (e.g., R8C8) for output pixel R11,C10 may be calculated as follows:

$$\frac{(8 - COL_{OFFS}) * (8 - ROW_{OFFS})}{64} = 0.47 \quad (2)$$

where COL_OFFS=2 and ROW_OFFS=3. The weights of the other surrounding neighbors are calculated similarly yielding the respective weight values of 0.16, 0.09, and 0.28. Because pixel coordinate values are being interpolated, the ADDR_VLD flag 158 is asserted. As depicted in FIG. 12, the ADDR_INT 136 is determining an output pixel (e.g., R11C10) that maps to a fractional input coordinate (e.g., R3.3C10.0).

Figure 13:
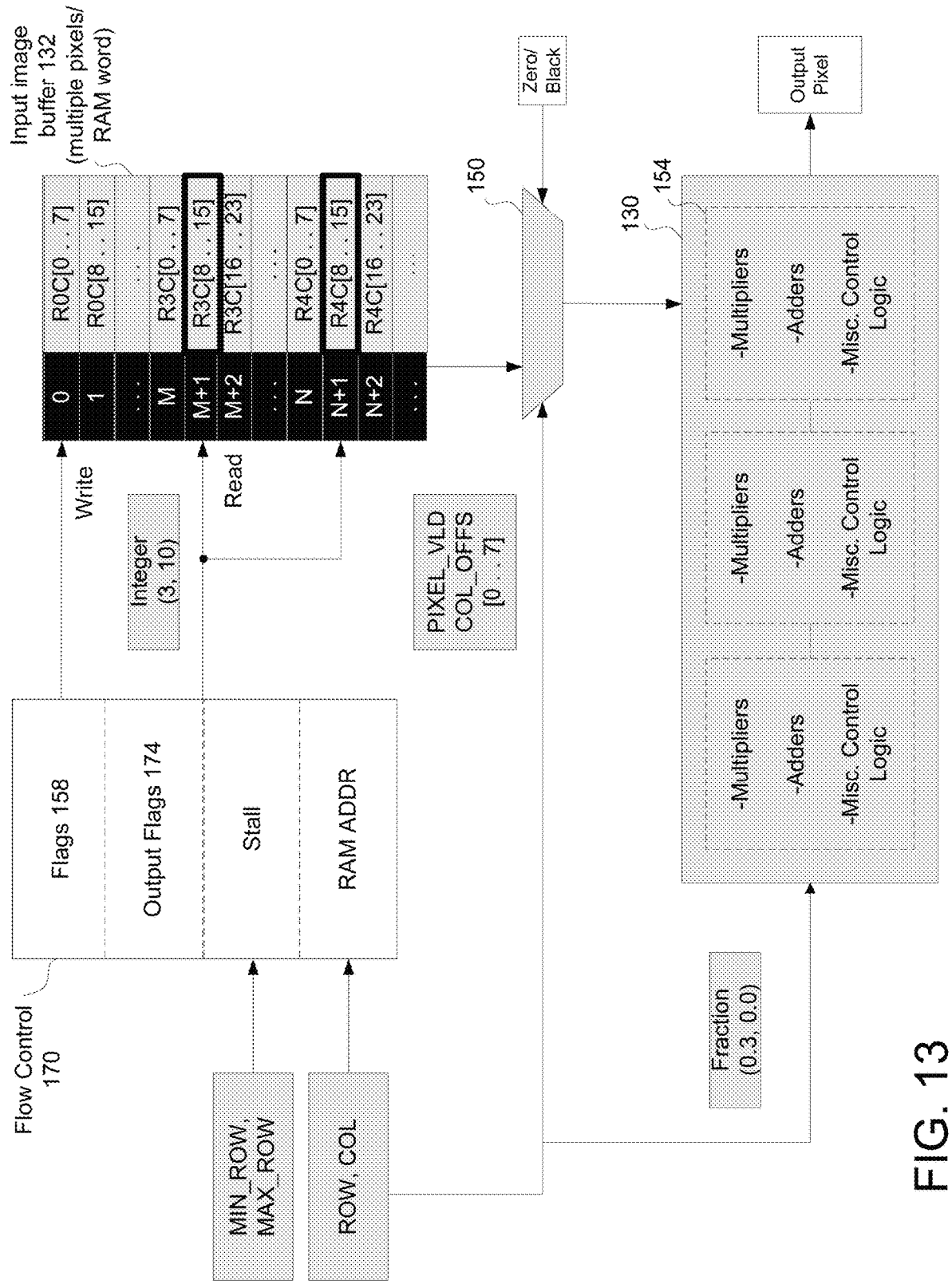
FIG. 13 is an exemplary embodiment of an operation of the ADDR_INT and a pixel interpolator (PIXEL_INT), according to the inventive concepts disclosed herein.

Still at step 806, and referring now to FIG. 13 a third interpolation process is performed by the PIXEL_INT 138 to interpolate pixel intensity values. In an exemplary embodiment, because the pixel coordinates interpolated in the second interpolation process are fractional, the third interpolation process uses a group of these fractional pixel coordinate values (e.g., four, with bilinear interpolation) to interpolate pixel intensity values.

Figure 14:
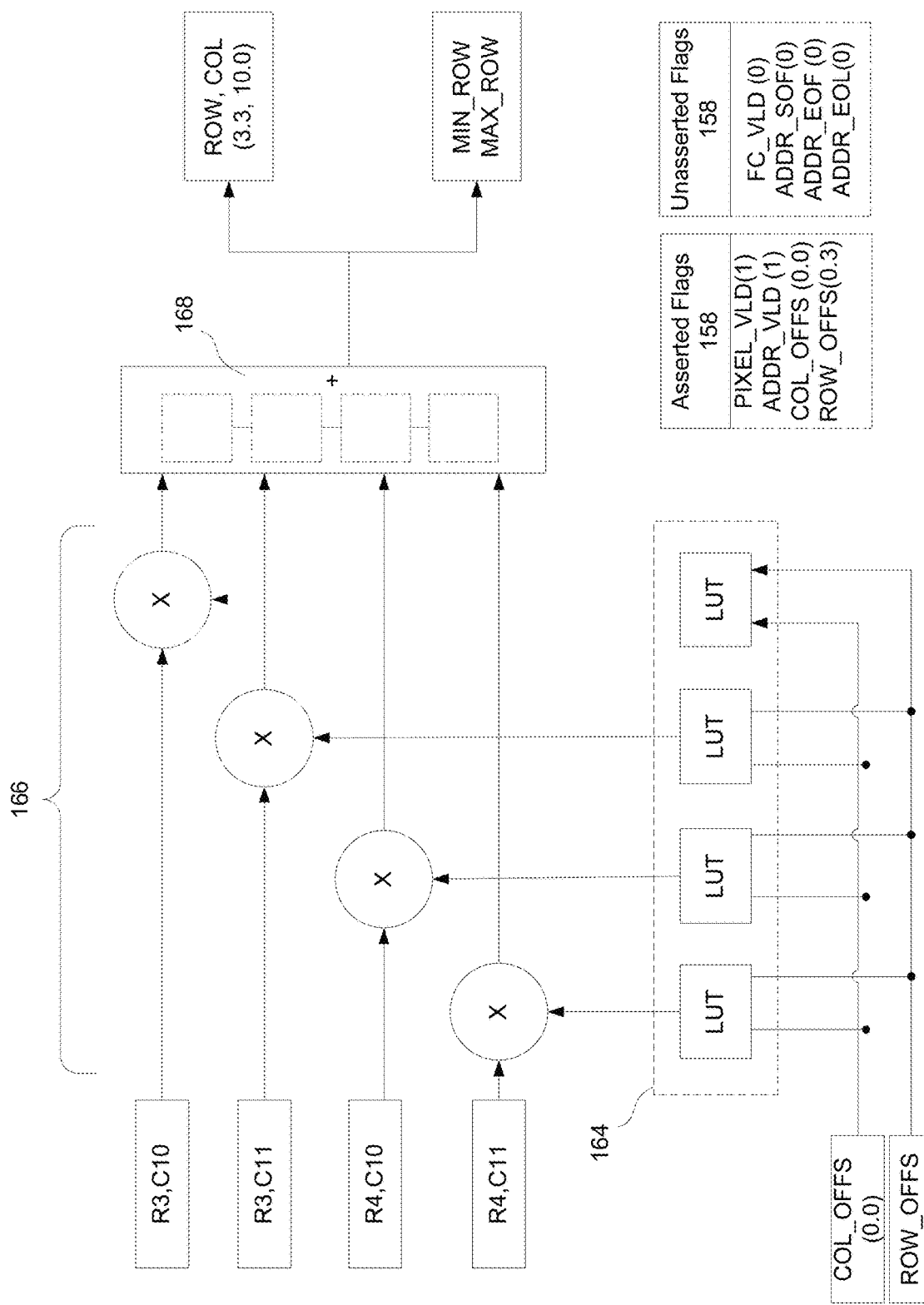
FIG. 14 is an exemplary embodiment of an operation of the PIXEL_INT, according to the inventive concepts disclosed herein.

For example (continuing the example provided above), the fractional input coordinate R3.3C10.0 has just been interpolated via the second interpolation process. The integer portion is used to address the RAM buffer 132, while the fractional portion is used in pixel intensity interpolation (e.g., provided by the combinational logic 154). For instance, to process output pixel R11C10, the PIXEL_INT 138 will fetch a neighborhood of pixels from input row 3 and input row 4 from buffer 132, since the computed input pixel address was R3.3C10. Referring now to FIGS. 13-14, to complete the interpolation, the input pixels R3C10, R3C11, R4C10 and R4C11 will be fetched, provided to combinational logic 154, corresponding weight values obtained from LUTs 164 (e.g., similar to Equations (1) and (2) above), and interpolation performed similar to the ADDR_INT 136.

It is noted that in the continued example, since there is no fractional part to the column number, R3C11 and R4C11 will be weighted as zero and not actually included in the output pixel value. It is further noted that if the input pixel coordinate happens to fall on the most significant pixel of a RAM word (e.g., C7 of a RAM word storing 8 pixels), the PIXEL_INT 138 must stall the pipeline for one cycle (e.g., create a one-clock bubble) and issue two more fetches to complete the four-pixel neighborhood because the required neighbor pixel values are in separate RAM words. For instance, the pipeline would be required to stall if R3.3C15.5 had been computed as an input coordinate. This is because the PIXEL_INT 138 needs to fetch input pixels R3C15, R3C16, R4C15 and R4C16 to complete the interpolation (e.g., located in different RAM words). The stall bubble is required because R3C15 and R3C16 cannot be fetched in a single read due to the necessary input pixels being located in separate RAM words The stall bubble would similarly be required for R4C15 and R4C16. In an exemplary embodiment, if a PIXEL_INT 138 has an 8-pixel wide RAM buffer, the stall bubble will occur on average one-eighth (12.5%) of the time (e.g., every Nth pixel of an N-pixel wide RAM word), which is easily absorbed by idle time during vertical and horizontal blanking in the video stream.

In an exemplary embodiment, the combinational logic 154 represents a plurality of combinational logic circuits used in interpolating each component or channel of a color encoding scheme (e.g., PIXEL_INT 138 is modified to triplicate its multipliers 166 and adders 168). For example, if a 24-bit RGB color sequence is used, an 8-bit channel for each component (e.g., red, green or blue) may be required.

Thus, combinational logic 154 may include a first set of multipliers 166 and adder 168, a second set of multipliers 166 and adder 168, and a third set of multipliers 166 and adder 168 for a respective channel. In an exemplary embodiment, the same LUTs 164 are used for each of the three sets of combinational logic 154. In another exemplary embodiment, a different set of LUTs 164 is used for each of the three sets of combinational logic 154.

It is noted that while the PIXEL_INT 138 is depicted as including repeating units in order to accommodate separate RGB channels, this depiction is not limiting. For example, an entire DC sub-system 118 may be used for each separate RGB channel. For instance, the DC sub-system 118 may be modified such that the entire DC sub-system 118 is triplicated. This type of a modification would allow for unique, color-specific SMTs to be uploaded separately and respectively to a unique, color-specific DC sub-system. By way of another example, the buffer 132 may be split into unique, color-specific portions, and separate color-specific interpolation logic may be used correspondingly for a color-specific portion of the split buffer 132.

In some embodiments, the replication of combinational logic 148 depends on a design of the DC sub-system 118. For example, a DC sub-system 118 configured to correct distortion for a display 108 that implements a single-color system (e.g. grayscale), may require a single instance of each of the ADDR_INT 136 and the PIXEL_INT 138. By way of another example, if the display 108 implements a basic color system (e.g., 24-bit RGB), only the PIXEL_INT interpolator logic may need to be triplicated (e.g., so that R, G and B are independently interpolated). Finally, if the display implements an advanced color system with chromatic aberration (e.g., where R, G and B layers have different distortion patterns), the entire circuit DC subsystem 118 may need to be triplicated.

Referring again to FIG. 8, a step 808 may include providing the distortion correction values to a display (e.g., display 108) or a subsequent image processing block (e.g., image processing sub-block 146). In an exemplary embodiment, the distortion correction values output are third distortion correction values (e.g., R/G/B pixel intensity values in the range of 0-255, sRGB pixel intensity values, scRGB (16) pixel intensity values, YCrCb pixel intensity values, YUV pixel intensity values, or combinations thereof). In an exemplary embodiment, a portion of the step 808 may be stalled in order to ensure input pixel values in the buffer 132 are not overwritten before they are utilized for interpolation. In an exemplary embodiment, the image processor 130 is configured to produce one output pixel per clock cycle, resulting in low clock rates (e.g., less than 200 MHz) and supporting low-power goals.

In an exemplary embodiment of the inventive concepts disclosed herein, the PIXEL_INT 138 is configured to coordinate and control the stalls that occur in the steps 802 and 808. Referring now to FIGS. 13-16, an exemplary embodiment of the PIXEL_INT 138 includes an input pixel buffer 132 and intelligent flow-control sub-block 170 that stalls the input stream if it is about to overwrite pixels that are still needed for interpolation, or stalls the output stream if required input pixels have not yet arrived. The PIXEL_INT 138 implements the flow control sub-block 170 to maintain a valid window of pixels in a working frame as dictated by flow control parameters. The flow control sub-block 170 also enables the PIXEL_INT 138 to determine when old pixel coordinates of a buffering frame written to buffer 132 may be overwritten by new pixel coordinates of the same frame.

Generally, the working frame and the buffering frame are the same. However, at the frame boundaries the working frame will briefly be one frame behind (e.g., at the bottom of the previous frame while the buffering frame is at the top of the next).

In an exemplary embodiment, the PIXEL_INT 138 is the first and final stage/block in the DC sub-system 118. For example, the PIXEL_INT 138 may access the input image data 140 and temporarily store the data 140 in buffer 132, and the PIXEL_INT 138 may communicate output pixel values to a display (e.g., display 108) or an image processing block (e.g., image processing sub-block 146).

Referring again to FIGS. 13-16, an exemplary embodiment of the PIXEL_INT 138 configured to stall buffer 132 is illustrated. For example, processor 130 may be processing output pixel R11C10 (e.g., FIG. 13). In order to do so, the ADDR_INT 136 has just interpolated pixel coordinate R3.3C10.0. As discussed above, the processor 130 will fetch (e.g., FIG. 14) a neighborhood of input pixels from row 3 and row 4 (e.g., R3C10, R3C11, R4C10 and R4C11).

Figure 15:
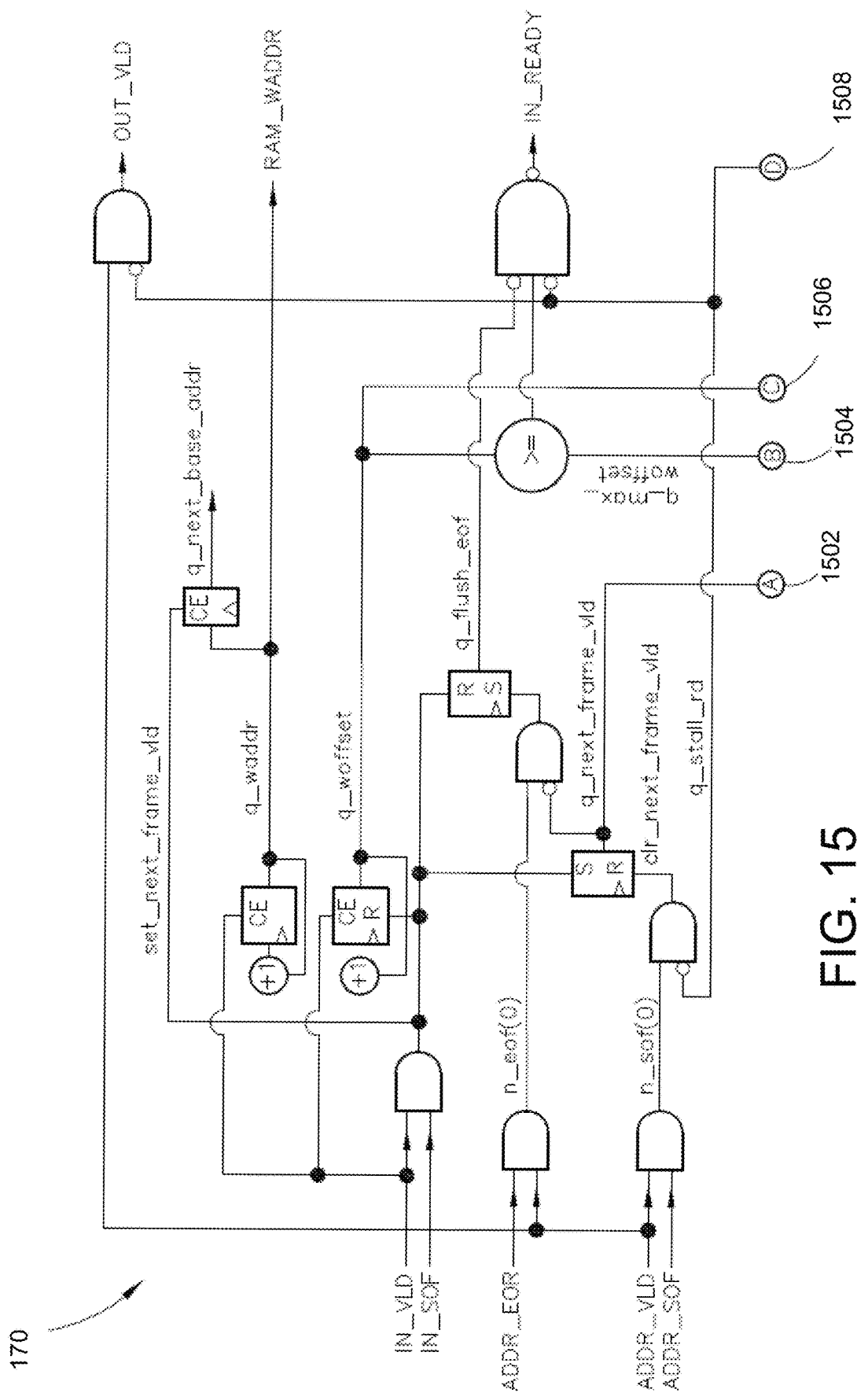
FIG. 15 is an exemplary embodiment of an operation of the PIXEL_INT and flow control sub-block, according to the inventive concepts disclosed herein.
Figure 16:
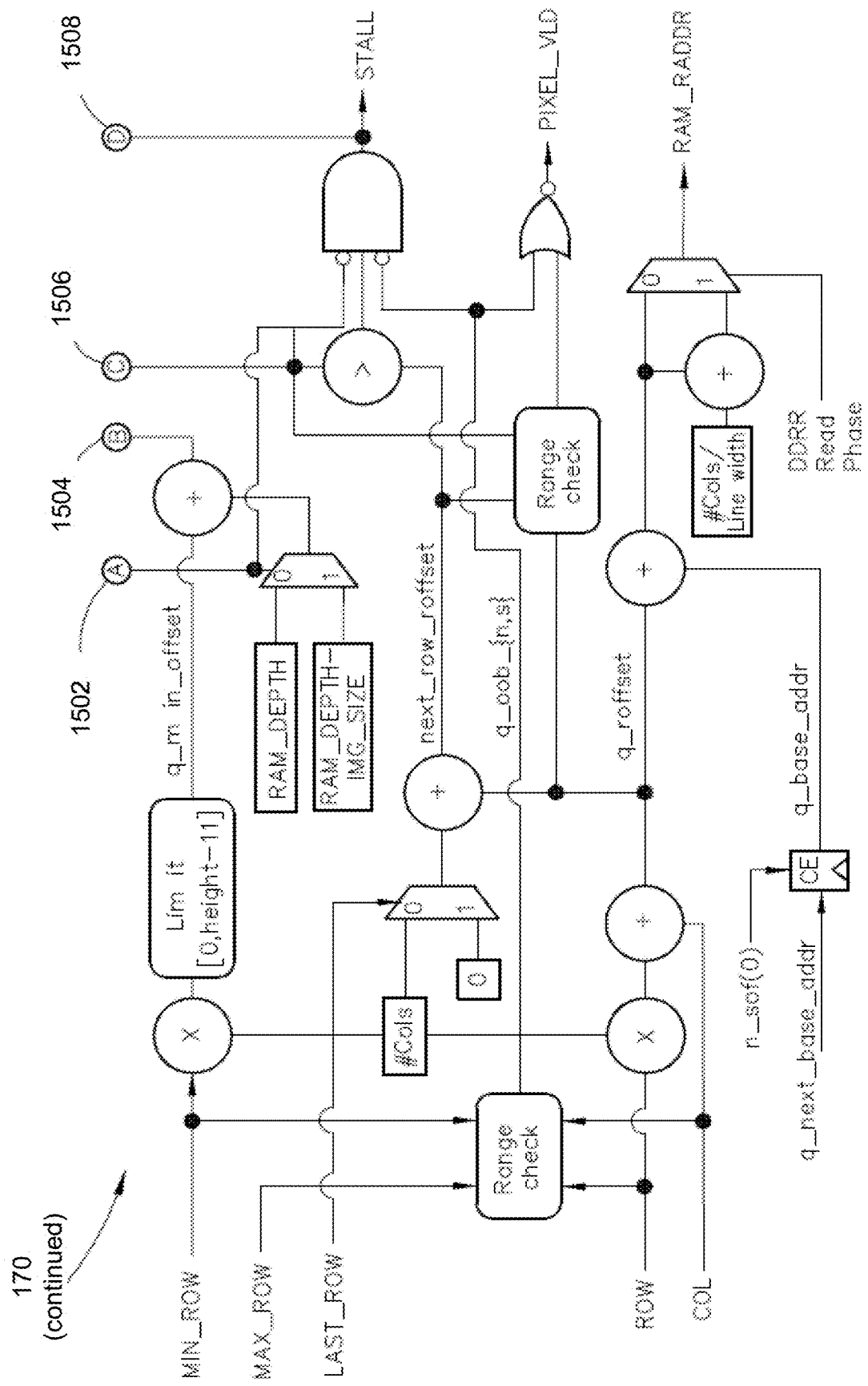
FIG. 16 is a continued exemplary embodiment of the operation of the PIXEL_INT and the flow control sub-block, according to the inventive concepts disclosed herein.

Referring now to FIGS. 15-16, an exemplary embodiment of the flow control sub-block 170 includes a combination of AND logic gates, NOR logic gates, multipliers, adders, and multiplexers as illustrated. The flow control sub-block 170 generates IN_READY, OUT_VLD and STALL outputs needed to control both the input and output flows, so that input pixels are not overwritten in the circular buffer 132 until they are no longer needed, and so that output pixels are not generated until the necessary input pixels are available for interpolation. In an exemplary embodiment, a stall may occur every Nth pixel of an N-pixel RAM word due to pixel values being located in separate RAM words.

In an exemplary embodiment, the logic gates of flow control sub-block 170 are configured to assert one or more output flags 174 to indicate when the current output neighborhood is valid. For example, an OUT_VLD flag 174 may be asserted when the current address values are valid (ADDR_VLD) and none of the stall conditions are met.

Referring again to FIGS. 15-16, an exemplary embodiment of a flow control sub-block 170 includes logic gates configured to implement a stall/halt during a write cycle (e.g., buffering frame) of the circular buffer 132. For example, the stall/halt may occur during a write cycle of buffer 132 to ensure that the buffer 132 does not overwrite older data in the buffer that is still needed for interpolation. For instance, the PIXEL_INT 138 may multiply the MIN_ROW parameter by the image/video width to calculate q_min_roffset. In an exemplary embodiment, if q_min_woffset exceeds q_min_roffset, the PIXEL_INT 138 may de-assert IN_READY to halt the input to the buffer 132.

By way of another example, the stall/halt may occur when the pixels needed for interpolation have not yet been written to the buffer (e.g., at step 802). For instance, if bilinear interpolation is used, then the second interpolation process may require a four-pixel neighborhood. The logic gates of sub-block 170 must account for each of the required pixels in the neighborhood (e.g., [COL, ROW], [COL+1, ROW], [COL, ROW+1] and [COL+1, ROW+1]). To do so, the logic gates of sub-block 170 may be configured to compute next_row_offset=q_roffset+WIDTH+1, the value of which may be compared to q_woffset. If the comparison shows that the value is greater than q_woffset, then the desired pixel neighborhood has not yet been written to the buffer 132, and a STALL flag is asserted, halting PIXEL_INT 138 until the required neighborhood is received. In another exemplary embodiment, if the value of next_row_offset=q_roffset+WIDTH+1 is outside a valid range, then the coordinate is invalid, the corresponding output pixel is blacked out, and the PIXEL_INT 138 does not stall. For example, a coordinate may fall outside one or more input image boundaries or may fall outside MIN_ROW/MAX_ROW bounds determined by the ADDR_INT 136 or provided by the SMT 134, accordingly the PIXEL_INT 138 should not stall to attempt to obtain values for interpolation, and the invalid output coordinates are simply zeroed/blacked.

In some embodiments, these boundary checks enable graceful handling of edge conditions. For example, the boundary checks in add-compare-and-select circuit 150 may allow the DC sub-system 118 to continue to follow the proper distortion surface all the way to the edge of the input image, maintaining proper image proportions. Furthermore, due to the interpolation scheme, the algorithm naturally provides a gradient fade to black at the edges, which is visually appealing.

In an exemplary embodiment, the logic gates of flow control sub-block 170 include deadlock controls to ensure that the PIXEL_INT 138 never asserts STALL while de-asserting IN_READY. Although deadlock would only happen if the SMT 134 was incorrectly written to require more buffer capacity than is available, the deadlock controls provide fail-safe conditioning.

Figure 17:
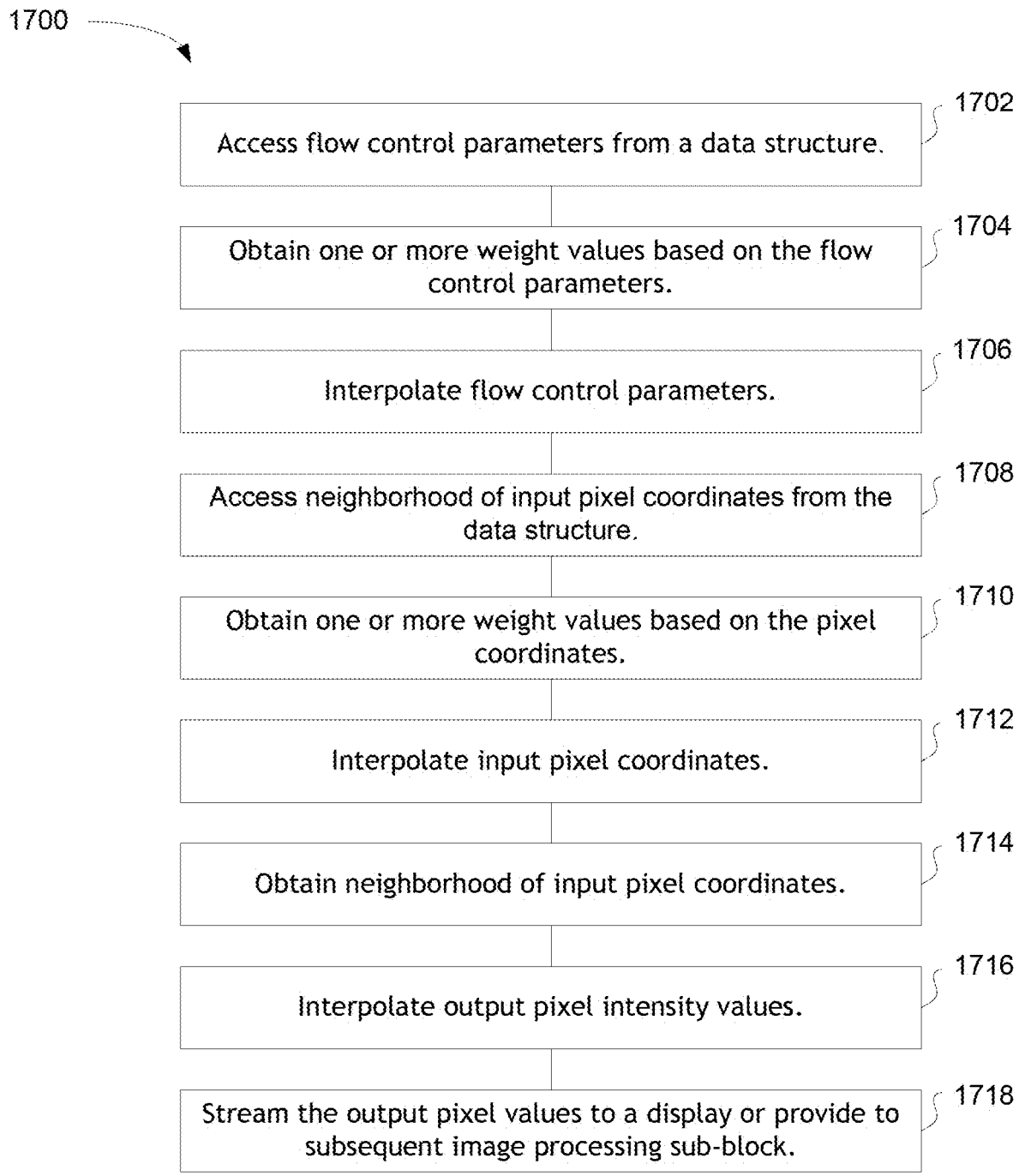
FIG. 17 is a process diagram of an exemplary embodiment of a DC method, according to the inventive concepts disclosed herein.

It is noted that in some embodiments, one or more steps of method 800 may be combined or repeated without departing from the inventive concepts disclosed herein. For example, referring now to FIG. 17, an exemplary embodiment of a method 1700 according to the inventive concepts disclosed herein may be implemented similarly to method 800 except that method 1700 more explicitly illustrates each interpolation process, according to the inventive concepts disclosed herein.

Figure 18:
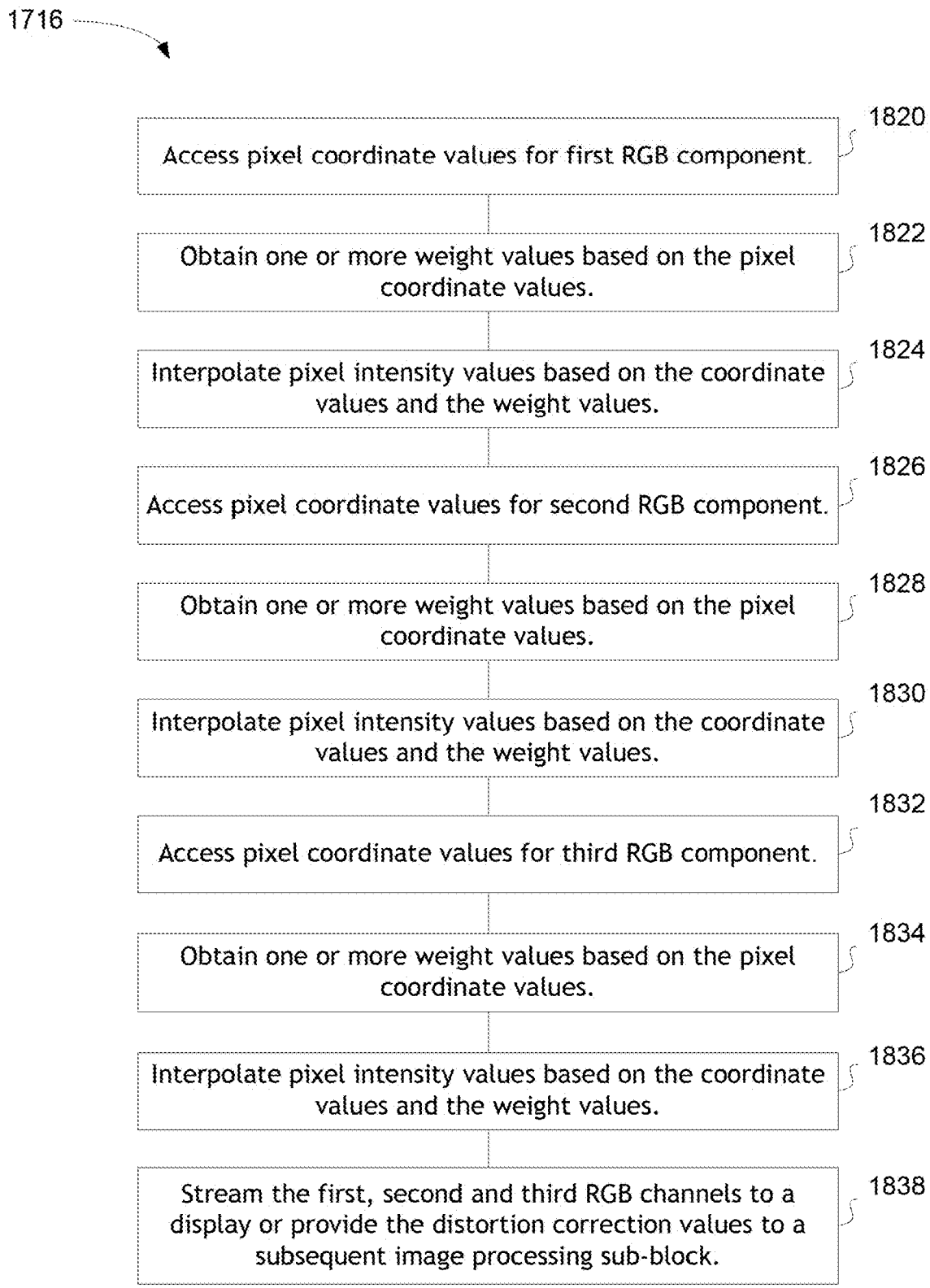
FIG. 18 is a sub-process diagram of an exemplary embodiment of an interpolation step of the process in FIG. 17, according to the inventive concepts disclosed herein.

Referring now to FIG. 18, an exemplary embodiment of a method 1716 includes a separate sub-interpolation process for each color channel. For example, a 24-bit RGB color encoding may include three separate 8-bit channels (e.g., one for each red, green and blue component). In an exemplary embodiment, the third interpolation process performed by the PIXEL_INT 138 (e.g., step 1716 of FIG. 17) includes three separate sub-interpolation processes.

For example, a first sub-interpolation process includes steps 1820-1824. The step 1820 may include receiving one or more pixel coordinate values as interpolated by the ADDR_INT 136. Again, these pixel coordinate values may be fractional for precision in interpolating.

A step 1822 may include obtaining one or more weight values based on the received pixel coordinate values. In an exemplary embodiment, the one or more weight values are obtained from LUTs.

A step 1824 may include interpolating pixel intensity values based on the pixel coordinate values and the weight values for a particular RGB component or RGB channel. In an exemplary embodiment, this sub-interpolation process is carried out in the combinational logic circuit 154.

In an exemplary embodiment, the steps 1820-1824 are repeated (e.g., steps 1826-1836) for the second and third sub-interpolation processes (e.g., for each RGB component or each RGB channel). In another exemplary embodiment, there is a first RGB component (e.g., red), a second RGB component (e.g., green), and a third RGB component (e.g., blue).

A step 1838 may include streaming the first, second and third RGB channels (e.g., one for each component) to a display or to a subsequent image processing block/sub-block 146. In an exemplary embodiment, the first, second and third RGB channels are streamed in a raster scanning order.

In an exemplary embodiment of the inventive concepts disclosed herein, components of the DC sub-system 118 are components of an integrated circuit. For example, the buffer 132, the SMT 134, the combinational/control logic 148, the processor 130 implementing the logic 148, each of the various LUTs, the flow control 170, or combinations thereof, are all components of an integrated circuit. In another exemplary embodiment, the components can fit along with many other image processing kernels on a single conventional field programmable gate array (FPGA), and adds only a small amount of power (e.g., less than 100 mW) to the overall design.

Although the DC sub-system 118 disclosed herein is directed towards image/video data signal processing, the inventive concepts of the DC sub-system may be recognized by those skilled in the art to apply equally to any electromagnetic signal requiring distortion correction.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A boresighting system, comprising:
    a radar emitter;
    an image source comprising a radar antenna for capturing an image frame including an input image having a distortion value; and
    a distortion correction sub-system comprising a circular buffer sized proportional to the distortion value of the input image, a plurality of data structures stored in a non-transitory processor-readable medium, each of the plurality of data structures associated with a different amount of distortion, and at least one processor coupled to the non-transitory processor-readable medium and to the circular buffer and configured to:
    identify an alignment error between the radar emitter and image source based on variations in electromagnetic signals from the radar emitter and the image source;
    access, from a data structure in the plurality of data structures based on a relation between the associated different amounts of distortion and a corresponding sparse matrix, mapping values indicative of information to map output pixels of an output image to input pixels of the input image;
    obtain weight values based on the mapping values;
    determine distortion correction values based on the weight values and the mapping values;
    provide the distortion correction values to at least one of: a display and an image processing sub-block and apply a boresight adjustment based on the distortion correction value to align the radar emitter to the image source, wherein the circular buffer is apportioned into memory words, each of the memory words configured to store multiple pixels of the input image, wherein the distortion value is a maximum distortion value of the input image, the maximum distortion value based at least on a dimension of the input image multiplied by an amount of distortion.

2. The system of claim 1, wherein the data structure further comprises a sparse matrix table and the mapping values comprise flow control parameters and pixel coordinate values.

3. The system of claim 2, wherein the sparse matrix table is a first sparse matrix table, and wherein the at least one processor is configured to access a second sparse matrix table, the second sparse matrix table replacing the first sparse matrix table in the non-transitory processor-readable medium.

4. The system of claim 2, wherein the at least one processor is further configured to perform a first interpolation process for the flow control parameters, a second interpolation process for the pixel coordinate values, and a third interpolation process for pixel intensity values.

5. An apparatus for distortion correction in a boresight system, comprising:
a circular buffer sized proportionally to a distortion value of an input image, the circular buffer apportioned into memory words, each of the memory words configured to store multiple pixels of the input image, wherein the distortion value is a maximum distortion value of the input image, the maximum distortion value based at least on a dimension of the input image multiplied by an amount of distortion;
a plurality of data structures stored in a non-transitory processor-readable medium, each of the plurality of data structures associated with a different amount of distortion; and
a processor coupled to the non-transitory processor-readable medium and the circular buffer, the processor configured to:
identify an alignment error between a radar emitter and a radar antenna based on variations in electromagnetic signals from the radar emitter and the radar antenna;
access, from a data structure in the plurality of data structures based on a relation between the associated different amounts of distortion and a corresponding sparse matrix, mapping values indicative of information to map output pixels of an output image to input pixels of the input image;
obtain weight values based on the mapping values;
determine distortion correction values based on the weight values and the mapping values;
apply a boresight adjustment based on the distortion correction value to align the radar emitter to the radar antenna; and
communicate the distortion correction values to at least one of: a display and an image processing sub-block.

6. The apparatus of claim 5, wherein the input image is a first input image of a plurality of input images comprising video data.

7. The apparatus of claim 5, wherein the data structure is a sparse matrix table (SMT) with a predetermined SMT compression ratio.

8. The apparatus of claim 5, wherein the circular buffer comprises multi-port random access memory (RAM).

9. The apparatus of claim 8, wherein the memory words are RAM words, wherein the RAM comprises static RAM (SRAM) configured to store multiple pixels per RAM word.

10. The apparatus of claim 5, wherein the processor is further configured to overwrite input pixels temporarily stored in the buffer.

11. The apparatus of claim 10, wherein the overwritten input pixels are a first set of input pixels from an image frame, and wherein a second set of input pixels from the same image frame are obtained by the processor to overwrite the first set of input pixels.

12. The apparatus of claim 5, further comprising one or more combinational logic circuits for interpolating the distortion correction values, wherein the one or more combinational logic circuits comprise a plurality of multipliers configured to receive the weight values from respective lookup tables (LUTs) and a plurality of adders corresponding to the plurality of multipliers.

13. The apparatus of claim 5, wherein the circular buffer, the processor, and the non-transitory processor-readable medium are components of at least one of: a soldier mounted camera and display system, a rotary wing airborne drone system, a head mounted (HMD) display system, a handheld camera and display system, an integrated circuit, and a field programmable gate array (FPGA).

14. A method for distortion correction in a boresight system, comprising:
identifying an alignment error between a radar emitter and a radar antenna based on variations in electromagnetic signals from the radar emitter and the radar antenna;
accessing, by at least one processor, mapping values from a data structure in a plurality of data structures stored in a non-transitory processor-readable medium, each of the plurality of data structures associated with a different amount of distortion, the mapping values indicative of information to map output pixels of an output image to input pixels of an input image, wherein the at least one processor is coupled to a circular buffer sized proportionally to a distortion value of the input image, the circular buffer apportioned into memory words, each of the memory words configured to store multiple pixels of the input image, wherein the distortion value is a maximum distortion value of the input image, the maximum distortion value based at least on a dimension of the input image multiplied by an amount of distortion and the data structure selected based on a relation between the associated different amounts of distortion and a corresponding sparse matrix;
obtaining, by the at least one processor, weight values based on the mapping values;
determining, by the at least one processor, distortion correction values based on the weight values and the mapping values;
applying a boresight adjustment based on the distortion correction value to align the radar emitter to the radar antenna; and
communicating, by the at least one processor, the distortion correction values to at least one of: a display and an image processing block.

15. The method of claim 14, wherein the determining distortion correction values based on the weight values and the mapping values comprises interpolating flow control parameters, interpolating pixel coordinate values, and interpolating pixel intensity values.

16. The apparatus of claim 15, wherein the interpolating distortion correction values comprises: i) interpolating first distortion correction values based on first weighting values and the flow control parameters, ii) interpolating second distortion correction values based on second weighting values and the pixel coordinate values, and iii) interpolating third distortion correction values based on third weighting values and the pixel intensity values for one or more color channels.

17. The method of claim 16, wherein the first distortion correction values are interpolated before the second distortion correction values, the second distortion correction values are interpolated before the third distortion correction values, and the third distortion correction values are communicated to the display or the image processing block.

18. The method of claim 16, further comprising determining minimum and maximum row parameters using the first distortion correction values.

19. The method of claim 18, further comprising zeroing pixel coordinate values that are determined to be outside a predetermined threshold, the predetermined threshold being set according to the minimum or maximum row parameters or being set according to one or more dimensions of the input image.

20. The method of claim 14, further comprising stalling the determining of the distortion corrected values when an amount of mapping values received is insufficient to perform the determining of the distortion correction values, or stalling a circular buffer read when the circular buffer read reaches the Nth pixel of an N-pixel RAM word.

* * * * *